US009777646B2

(12) United States Patent
Bidner et al.

(10) Patent No.: US 9,777,646 B2
(45) Date of Patent: *Oct. 3, 2017

(54) DIRECT INJECTION OF DILUENTS OR SECONDARY FUELS IN GASEOUS FUEL ENGINES

(71) Applicant: Ford Global Technologies, LLC, Dearborn, MI (US)

(72) Inventors: David Karl Bidner, Livonia, MI (US); Mark Allen Dearth, Dearborn, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 855 days.

This patent is subject to a terminal disclaimer.

(21) Appl. No.: 13/889,069

(22) Filed: May 7, 2013

(65) Prior Publication Data

US 2014/0331970 A1 Nov. 13, 2014

(51) Int. Cl.
*F02D 19/00* (2006.01)
*F02D 19/08* (2006.01)
(Continued)

(52) U.S. Cl.
CPC ....... *F02D 19/081* (2013.01); *F02D 19/0642* (2013.01); *F02D 19/0647* (2013.01); *F02D 19/10* (2013.01); *F02D 19/12* (2013.01); *F02D 19/0689* (2013.01); *F02D 19/087* (2013.01); *F02M 26/05* (2016.02); *F02M 26/06* (2016.02); *Y02T 10/36* (2013.01)

(58) Field of Classification Search
CPC .... F02D 19/081; F02D 19/642; F02D 19/647; F02D 19/10; F02D 19/12

USPC .......................... 123/435, 527, 304, 299, 300
See application file for complete search history.

(56) References Cited

U.S. PATENT DOCUMENTS 3,498,767 A   3/1970   Foster
5,158,063 A * 10/1992   Hosoda et al. ............... 123/676
(Continued)

FOREIGN PATENT DOCUMENTS

EP   0073306 B1   4/1986
EP   1120561 A2   8/2001
(Continued)

OTHER PUBLICATIONS

Hochhauser, A., Koehl, W., Benson, J., Burns, V. et al., "Comparison of CNG and Gasoline Vehicle Exhaust Emissions: Mass and Composition—The Auto/Oil Air Quality Improvement Research Program," SAE Technical Paper 952507, 1995, doi:10.4271/952507.*

(Continued)

*Primary Examiner* — Jacob Amick
(74) *Attorney, Agent, or Firm* — Julia Voutyras; McCoy Russell LLP

(57) ABSTRACT

A method for operating an engine, comprising port injecting a first quantity of a first gaseous fuel in a cylinder cycle and direct injecting a second quantity of a secondary injectant in the cylinder cycle as a function of a desired air-to-fuel ratio (AFR), the desired AFR based on a temperature of an engine cylinder valve. The desired AFR may be outside the AFR range available during natural gas combustion alone and thus allows for cooler engine operation.

17 Claims, 12 Drawing Sheets

(51) Int. Cl.
  *F02D 19/06* (2006.01)
  *F02D 19/10* (2006.01)
  *F02D 19/12* (2006.01)
  *F02M 26/05* (2016.01)
  *F02M 26/06* (2016.01)

(56) References Cited

U.S. PATENT DOCUMENTS

| | | | |
|---|---|---|---|
| 5,546,908 A | 8/1996 | Stokes | |
| 5,718,194 A | 2/1998 | Binion | |
| 5,727,519 A * | 3/1998 | Kawamura | 123/262 |
| 7,287,509 B1 * | 10/2007 | Brehob | 123/299 |
| 7,398,763 B2 | 7/2008 | Gibson et al. | |
| 7,444,987 B2 | 11/2008 | Cohn et al. | |
| 7,520,272 B2 * | 4/2009 | Fritz et al. | 123/527 |
| 7,546,834 B1 * | 6/2009 | Ulrey et al. | 123/525 |
| 8,166,953 B2 | 5/2012 | Caley | |
| 8,327,687 B2 | 12/2012 | Amann et al. | |
| 8,930,119 B2 * | 1/2015 | Ruggiano | 701/104 |
| 2007/0101968 A1 | 5/2007 | Gibson et al. | |
| 2010/0121559 A1 | 5/2010 | Bromberg et al. | |
| 2010/0206260 A1 | 8/2010 | Tobias et al. | |
| 2012/0143480 A1 | 6/2012 | Pursifull | |
| 2013/0046452 A1 * | 2/2013 | Moscherosch | F02D 19/061 701/103 |
| 2013/0199499 A1 | 8/2013 | Pursifull | |
| 2014/0331642 A1 * | 11/2014 | Dearth et al. | 60/273 |
| 2014/0331970 A1 * | 11/2014 | Bidner et al. | 123/435 |

FOREIGN PATENT DOCUMENTS

| | | | |
|---|---|---|---|
| EP | 1213457 A2 | 6/2002 | |
| EP | 1230327 B1 | 6/2006 | |
| EP | 1213457 B1 | 11/2006 | |
| EP | 1985833 A2 | 10/2008 | |
| EP | 2048339 A1 | 4/2009 | |
| EP | 2071234 A2 * | 6/2009 | F23C 13/06 |
| JP | H05263698 A | 10/1993 | |
| JP | 2002054522 A | 2/2002 | |
| JP | 2004156552 A | 6/2004 | |
| JP | 2005337100 A | 12/2005 | |
| WO | 0236946 A1 | 5/2002 | |
| WO | 2007092142 A2 | 8/2007 | |
| WO | 2010089568 A1 | 8/2010 | |

OTHER PUBLICATIONS

"Synthesis Gas, (syngas), Producer Gas Use in Gas Engines." Clarke Energy. Web. Apr. 21, 2015. <https://www.clarke-energy.com/synthesis-gas-syngas/>.*
Pursifull, Ross Dykstra, "Gaseous Fuel System and Method for an Engine," U.S. Appl. No. 13/682,514, filed Nov. 20, 2012, 35 pages.
Bidner, David Karl et al., "Method and System for Engine Control," U.S. Appl. No. 13/743,237, filed Jan. 16, 2013, 32 pages.
Badillo, Ed et al., "Method and System for Engine Control," U.S. Appl. No. 13/754,667, filed Jan. 30, 2013, 39 pages.
Church, Jeremy Walter, "Feed Forward Dynamic Spool Valve," U.S. Appl. No. 13/762,018, filed Feb. 7, 2013, 33 pages.
Zhang, Xiaogang, "Strategy for Engine Cold Start Emission Reduction," U.S. Appl. No. 13/778,691, filed Feb. 27, 2013, 21 pages.
Rumpsa, Todd Anthony, "Method for Operating a Direct Fuel Injector," U.S. Appl. No. 13/852,824, filed Mar. 28, 2013, 26 pages.
Dearth, Mark Allen et al., "Direct Injection of Diluents or Secondary Fuels in Gaseous Fuel Engines," U.S. Appl. No. 13/889,047, filed May 7, 2013, 46 pages.
Bidner, David Karl et al., "Direct Injection of Diluents or Secondary Fuels in Gaseous Fuel Engines," U.S Appl. No. 13/889,103, filed May 7, 2013, 65 pages.
Bidner, David Karl et al., "Method for Reducing Valve Recession in Gaseous Fuel Engines," U.S. Appl. No. 13/889,080, filed May 7, 2013, 36 pages.
Bidner, David Karl et al., "Method for Reducing Valve Recession in Gaseous Fuel Engines," U.S. Appl. No. 13/889,094, filed May 7, 2013, 36 pages.
Packman, Keith, "Lean-Burn Engine Technology Increases Efficiency, Reduces NOx Emissions," Technical Information from Cummins Power Generation, Power Topic #7009, 2007, 2 pages.

* cited by examiner

DIRECT INJECTION OF DILUENTS OR SECONDARY FUELS IN GASEOUS FUEL ENGINES

BACKGROUND AND SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. Various engine systems may be used with CNG fuels, utilizing various engine technologies and injection technologies that are adapted to the specific physical and chemical properties of CNG fuels. For example, mono-fuel engine systems may be configured to operate with CNG while multi-fuel systems may be configured to operate with CNG and one or more other fuels, such as gasoline or gasoline blend liquid fuels. Engine control systems may operate such multi-fuels systems in various operating modes based on engine operating conditions.

However, CNG engines, particularly engines that have been converted to run on CNG, may experience numerous operating problems. CNG has marginal ignitability and a narrow rich limit compared to gasoline and other traditional fuels. Thus, when running a CNG engine at high loads, the temperature limit of the engine may be reached prior to fully combusting the fuel or air taken into the combustion cylinder. By not fully combusting the contents of the combustion cylinder, the likelihood of engine knock increases. Further, the combustion of CNG produces less soot than for an equivalent gasoline engine. This reduces the natural lubrication of engine valves, potentially leading to valve recession and degradation.

At peak operation, rich running gasoline engines may operate up to 40% rich to abate overheating. In comparison, NG engines operate around 10% rich at peak conditions. The inventors therefore developed a method to lower the air-fuel ratio (AFR) in natural gas engines so as to provide some of the valve protection that is present in gasoline engines.

To counter overheating problems, the air charge may be limited by either throttling airflow or running lean, but these solutions may limit the maximum power output of the engine. Specific power may be increased by increasing the size of the engine, but this may not be possible for all platforms or conversions. Injecting water or other control fluids into the combustion chamber may reduce temperatures and guard against engine knock, but may further reduce the ignitability of the fuel mixture.

CNG engines also experience increased valve wear for a number of reasons. Natural gas has a higher specific heat than gasoline and thus burns at a higher temperature. Natural gas also has a significantly smaller hydrocarbon concentration than gasoline engines. The inventors therefore developed a method to increase the operational AFR richness in natural gas engines so as to provide some of the valve protection that is present in gasoline engines.

The inventors herein have realized that the above issues may be at least partly addressed by injecting an amount of secondary fuel with a higher AFR rich operating limit into the combustion chamber or gaseous fuel source, the AFR at which the engine can operate may increase. Added liquid fuel also introduces higher latent cooling because heat energy is absorbed in the evaporative process. Liquid fuel may also acts as a diluent to lower flame temperature during combustion. A richer AFR also allows for more advanced spark timing not available in lean burning natural gas engines that, in combination with lower heat generation, also help to reduce engine knock tendency. Further, using a secondary fuel source with a higher hydrocarbon concentration allows for increased soot production that acts both as a valve lubricant, microwelding, and a thermal barrier thus abating valve recession. Using steam reformation, CNG may be reformed to provide secondary fuels such as CO and $H_2$ in some embodiments.

The inventors further realized that the above issues may be at least partly addressed for example, by a method for a turbocharged engine, comprising: during high load conditions, in response to an elevated engine temperature, after port injecting a first quantity of a first gaseous fuel, direct injecting a second quantity of a second, liquid or gaseous fuel at a first timing that is a function of a desired air-fuel ratio (AFR). In this way, engine power for an engine primarily fueled by the first, gaseous fuel may be maximized while simultaneously controlling the maximum combustion temperature and maximum combustion pressure and mitigating engine knock.

In another example, a method for a turbocharged engine may comprise: during high load conditions, in response to an elevated engine temperature, after port injecting a first gaseous fuel, direct injecting a second, liquid fuel at a timing that is after combustion spark-ignition, but during combustion of, the first gaseous fuel. In this way, a second, liquid fuel injected between spark ignition and a top-dead center event may reduce combustion temperature and pressure, regardless of the ignitability of the second, liquid fuel. Further, a second, liquid fuel injected after spark ignition and following a top-dead center event may reduce exhaust temperatures regardless of the ignitability of the second, liquid fuel. Liquid fuel also introduces higher latent cooling as heat energy is absorbed in the evaporative process of liquid fuel. The inventors also found that high hydrocarbon concentration of some liquid fuels (in comparison to natural gas) increases soot production that acts as a valve lubricant, microwelding, and thermal barrier to reduce valve wear.

In yet another example, a method for a turbocharged engine, comprising: during high load conditions, in response to engine knock, after port injecting a first gaseous fuel, direct injecting a second fuel while maintaining spark timing. In this way, engine knock in an engine primarily fueled by a gaseous fuel may be mitigated by injecting a second, liquid fuel coincident with combustion events, and without iteratively advancing and retarding spark timing in response to engine knock.

Further disclosed herein are systems for providing secondary fuel to the engine. For example, an embodiment may use a reformation catalyst within an EGR system to provide an intake with a gaseous secondary fuel source with a higher AFR richness operating limit. Other embodiments may use additional liquid fuel or gaseous tanks to provide a secondary fuel to the intake system. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example embodiment of a cylinder of an internal combustion engine.

FIG. 2 schematically depicts an example embodiment of a multi-cylinder engine.

Figure 10:
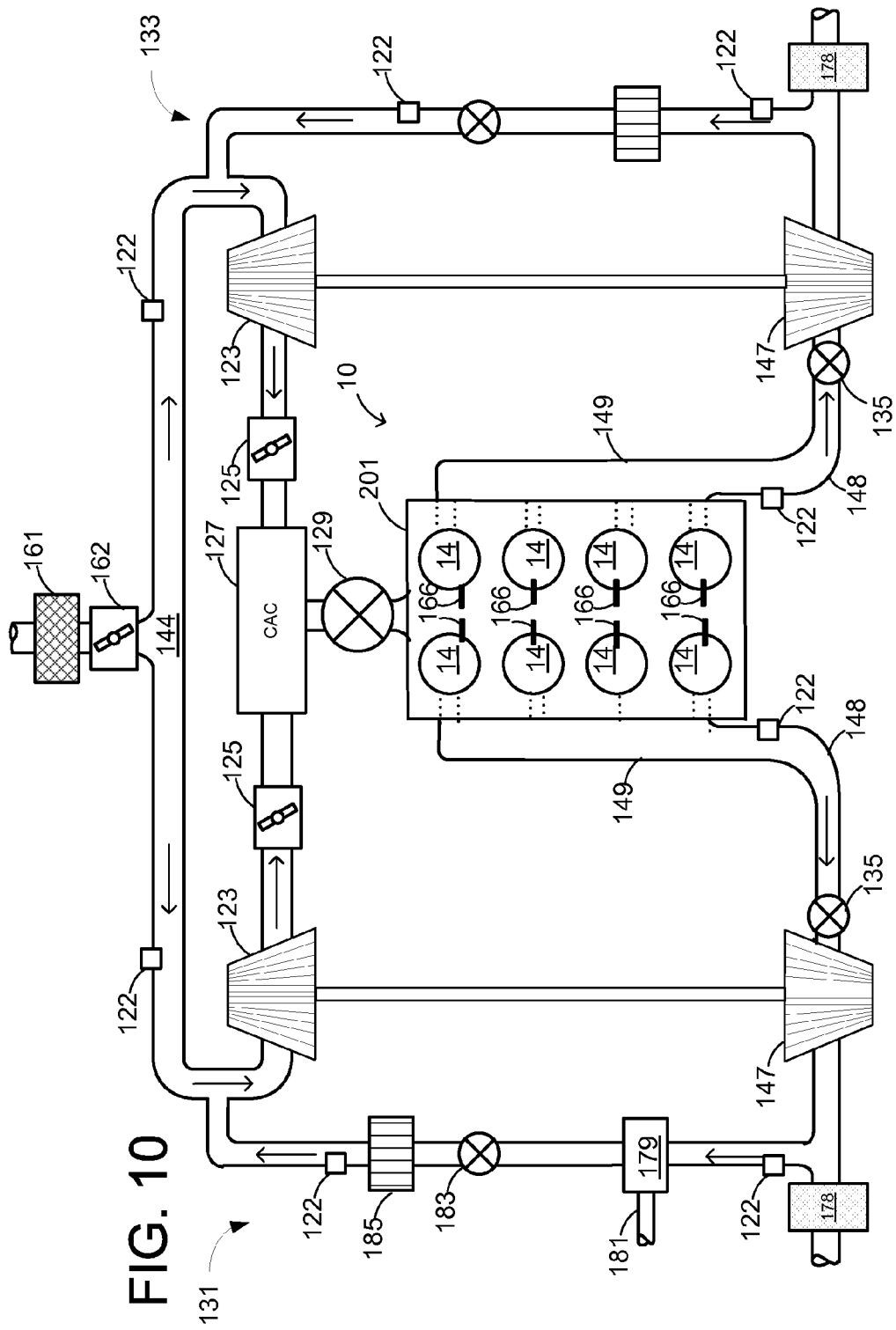

FIG. 10 schematically depicts an example embodiment of a natural gas enrichment system using steam reformation.

Figure 11:
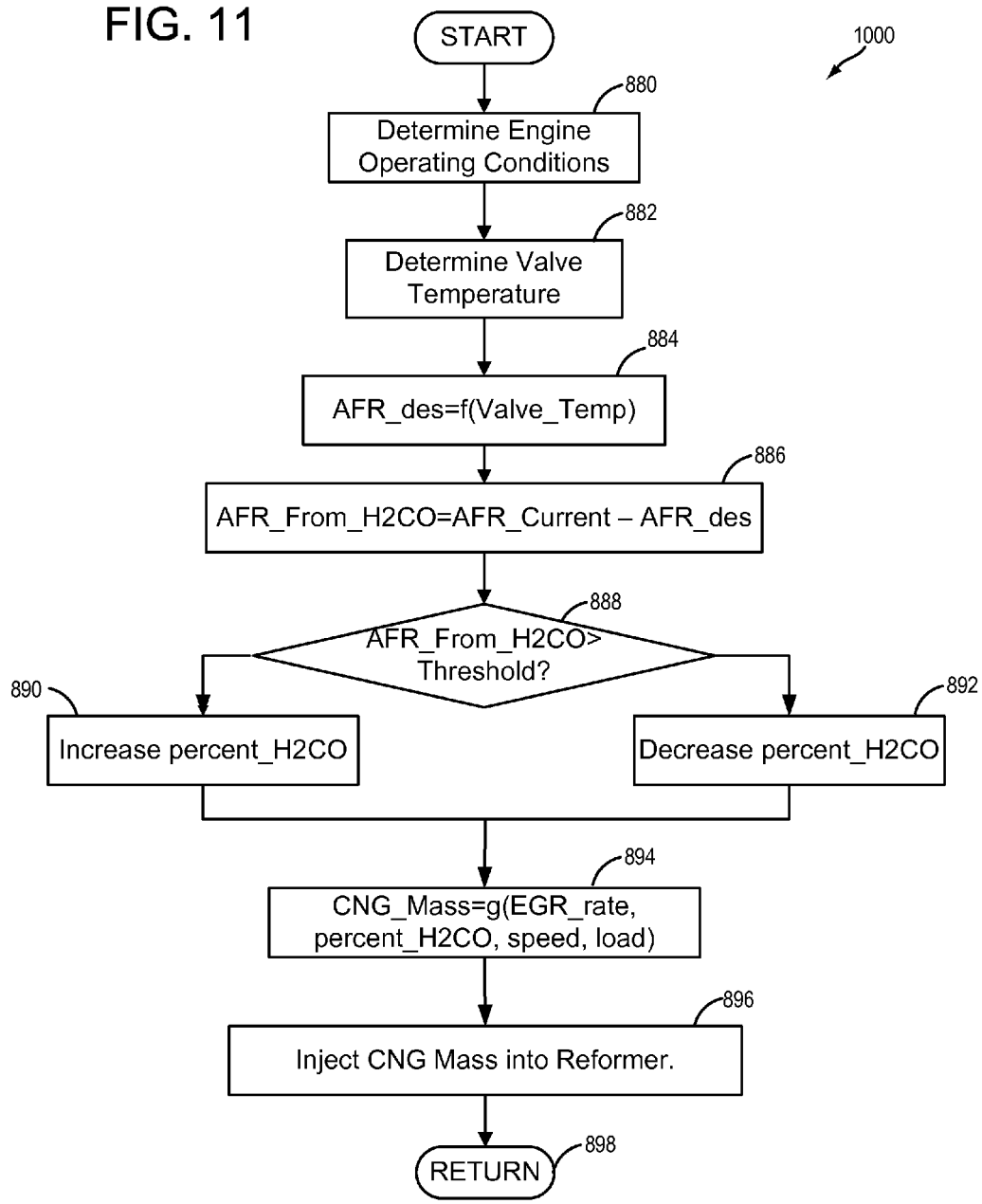

FIG. 11 depicts an example flow chart for injecting an additional gaseous fuel source.

Figure 12:
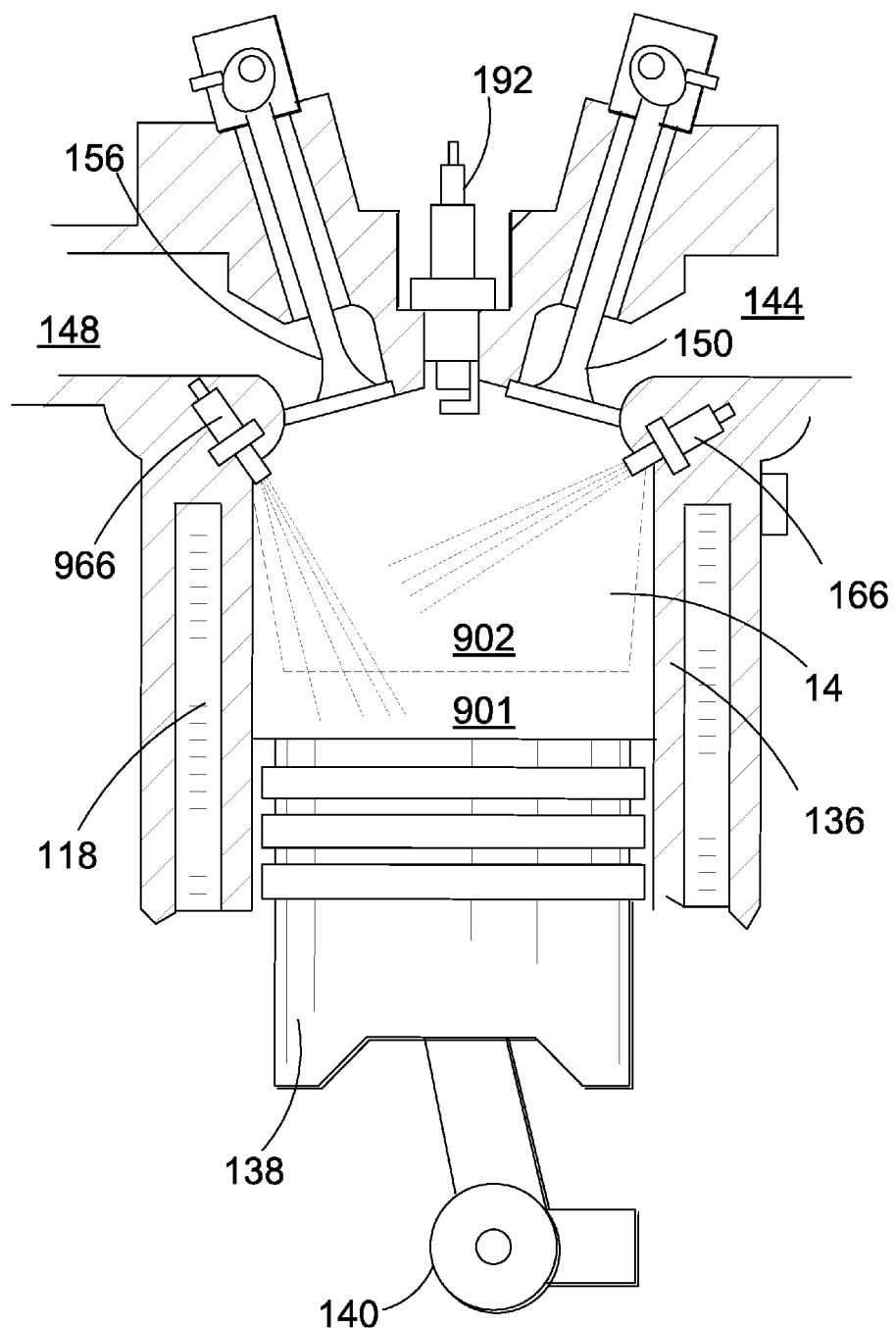

FIG. 12 schematically depicts an example embodiment of a cylinder of an internal combustion engine.

DETAILED DESCRIPTION

Figure 1:
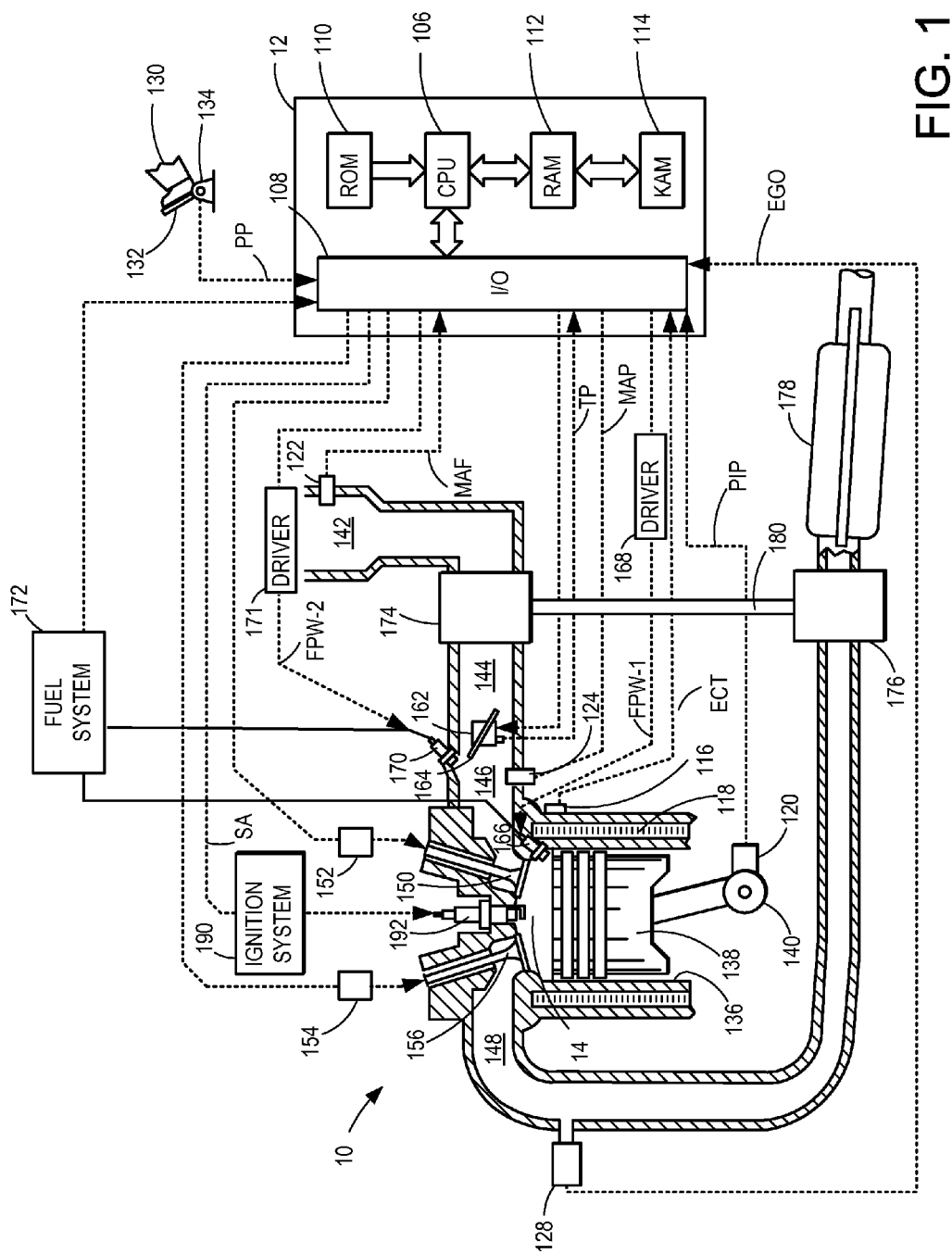
Figure 2:
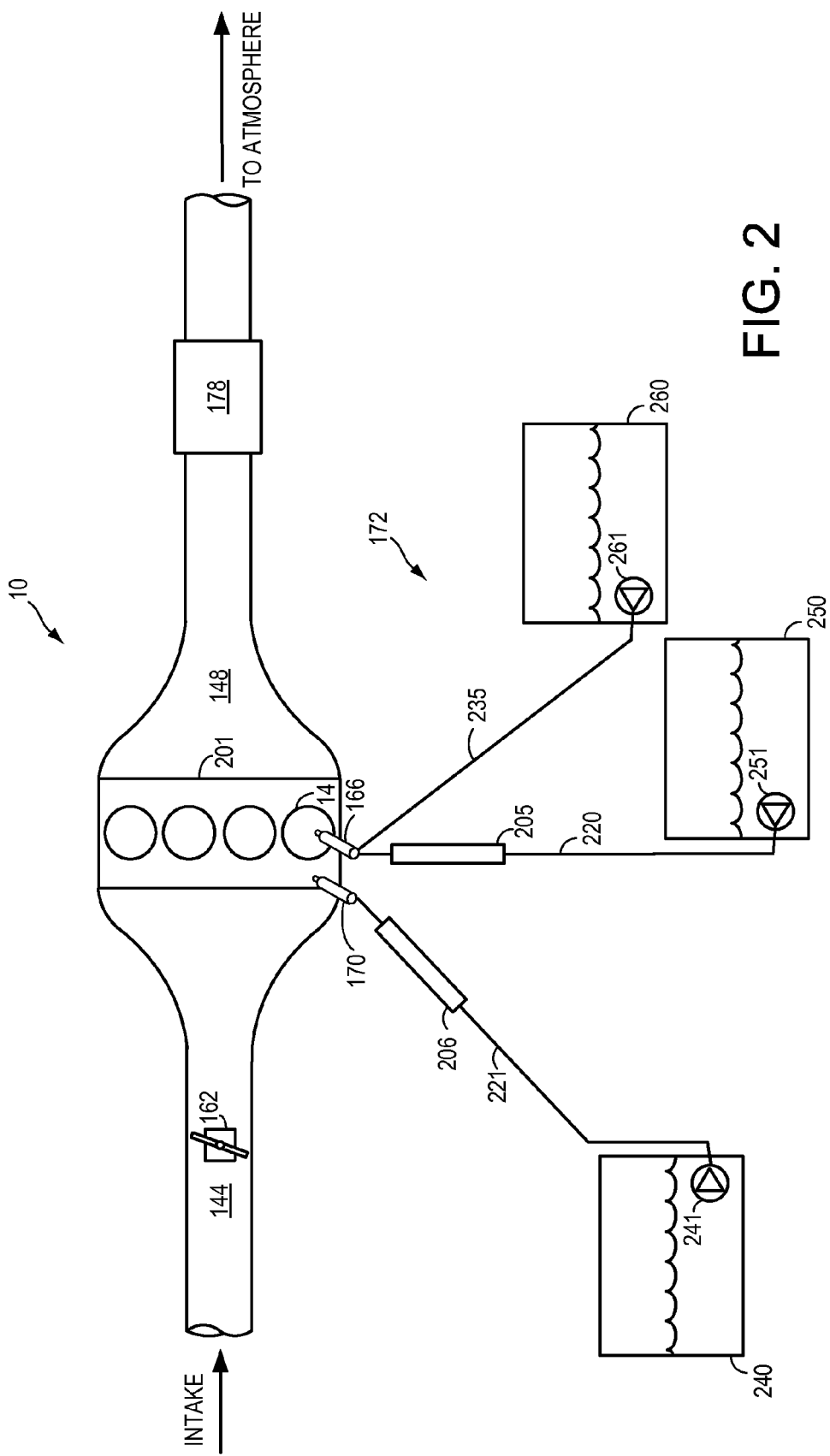

The following description relates to systems and methods for addressing overheating and engine knock in gaseous fueled engines, such as the engines schematically diagrammed in FIGS. 1 and 2. The systems may include a gaseous fuel tank coupled to a port-fuel injector and a secondary fuel tank of reservoir coupled to a direct-fuel injector. A controller may be programmed to control the rate and timing of fuel injection through a control routine, such as the routines described in FIGS. 3, 4, 6 and 8. The timing of fuel injection may be set to coincide with events during the combustion cycle of an engine cylinder, as depicted in FIGS. 5 and 7. An example embodiment of an engine system with an EGR and reformer device is shown in FIG. 10. The reformer device may be used in accordance to this disclosure to provide a secondary gaseous fuel source. A control routine for a system such as that depicted in FIG. 10 is shown in FIG. 11. Further, the direct-fuel injection may be controlled to be biased to injecting a fuel into regions of an engine cylinder prone to knocking, as schematically depicted in FIG. 12.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake passages 142, 144, and 146. Intake passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas AFR such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank holding a liquid fuel, such as gasoline, and also include a fuel tank holding a gaseous fuel, such as CNG. Fuel injectors 166 and 170 may be configured to inject fuel from the same fuel tank, from different fuel tanks, from a plurality of the same fuel tanks, or from an overlapping set of fuel tanks.

Controller 12 is shown in FIG. 1 as a microcomputer, including processor 106, input/output ports 108, an electronic storage medium for executable programs and calibration values shown as read-only memory 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 3.

FIG. 2 shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166 and 170. Although only one cylinder is shown coupled to fuel injectors, it is to be understood that all cylinders 14 included in cylinder head 201 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions. Control of the timing and quantity of fuel injection will be discussed further below and with regards to FIGS. 3-9.

Fuel injector 170 is shown coupled to fuel rail 206. Fuel rail 206 may be coupled to fuel line 221. Fuel line 221 may be coupled to fuel tank 240. Fuel pump 241 may be coupled to fuel tank 240 and fuel line 221. Fuel rail 206 may include a plurality of sensors, including a temperature sensor and a pressure sensor. Similarly, fuel line 221 and fuel tank 240 may include a plurality of sensors, including temperature and pressure sensors. Fuel tank 240 may also include a refueling port.

In some embodiments, fuel tank 240 may contain a gaseous fuel, such as CNG, methane, LPG, hydrogen gas, etc. In embodiments where fuel tank 240 contains a gaseous fuel, a tank valve may be coupled to fuel line 221 upstream of fuel pump 241. A line valve may be coupled to fuel line 221 upstream of the tank valve. A pressure regulator may be coupled to fuel line 221 upstream of the line valve. Fuel line 221 may also be coupled to a coalescing filter and may further include a pressure relief valve upstream of fuel rail 206.

Fuel injector 166 is shown coupled to fuel rail 205. Fuel rail 205 may be coupled to fuel line 220. Fuel line 220 may be coupled to fuel tank 250. Fuel pump 251 may be coupled to fuel tank 250 and fuel line 220. Fuel rail 205 may include a plurality of sensors, including a temperature sensor and a pressure sensor. Similarly, fuel line 220 and fuel tank 250 may include a plurality of sensors, including temperature and pressure sensors. Fuel tank 250 may also include a refueling port. In some embodiments, fuel tank 250 may contain a liquid fuel, such as gasoline, diesel, ethanol, E85, etc. In embodiments where fuel tank 250 contains a liquid fuel and fuel tank 240 contains a gaseous fuel, fuel rail 205 may be configured as a higher-pressure fuel rail and fuel rail 206 may be configured as a lower pressure fuel rail.

Fuel injector 166 is also shown coupled to supply line 235. Supply line 235 may be coupled to reservoir 260. Reservoir 260 may include pump 261. In some embodiments, pump 261 may be replaced with an aspirator. Supply line 235 is shown coupled directly to injector 166, but may be coupled to fuel rail 205 or a separate pressurization chamber. Supply line 235 may be coupled to a separate injector, which may be configured as a direct injector or a port injector.

In some embodiments, reservoir 260 may be a windshield wiper fluid tank, radiator coolant tank, or other liquid holding tank. In these examples, reservoir 260 may be coupled to additional supply lines via additional pumps or aspirators. Reservoir 260 may contain a fluid such as ethanol, methanol, an ethanol/water or methanol/water solution, liquid EGR, gasoline, etc. or may contain a gas such as $H_2$, CO, gaseous EGR, etc. In embodiments where reservoir 260 contains a fluid, the fluid may have a plurality of different qualities, including but not limited to include different alcohol content, different water content, different octane, different heat of vaporizations, different fuel blends, different water contents, different flammability limits, and/or combinations thereof etc. In embodiments where reservoir 260 contains a gas, a tank valve may be coupled to supply line 235 upstream of fuel pump 261. A line valve may be coupled to fuel line 235 upstream of the tank valve. A pressure regulator may be coupled to fuel line 235 upstream of the line valve. Fuel line 235 may also be coupled to a coalescing filter and may further include a pressure relief valve. Fuel line 235 may be coupled to one or more pressure and/or temperature sensors in communication with a controller.

The timing and flow rates of the direct injection of a secondary fuel or diluent may be coordinated to coincide with events occurring during the combustion sequence. Further, the timing and flow rates of the direct injection of a secondary fuel or diluent may be determined as a function of engine operating conditions or as a function of the composition of the secondary fuel or diluent. Further, spark timing and boost pressure may be adjusted in accordance with the timing and flow rates of the direct injection of a secondary fuel or diluent.

Figure 3:
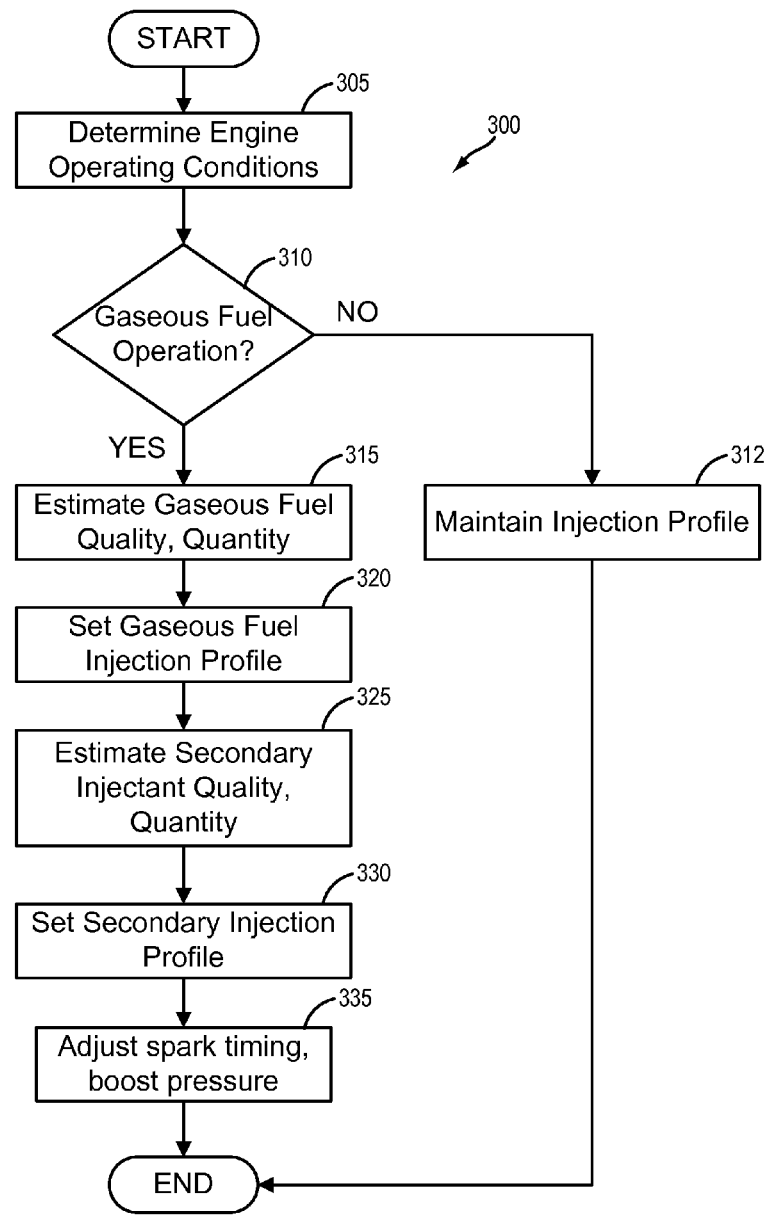
FIG. 3 depicts an example high level flow chart for operating an internal combustion engine including a port-fuel injection system and a secondary direct injection system according to the present disclosure.

FIG. 3 shows a flowchart depicting method 300 in accordance with the present disclosure. Method 300 may be carried out by controller 12. Method 300 may begin at 305 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc. Determining engine operating conditions may include determining whether the engine is operating at a high load condition. Herein, a high load condition may be defined as a load that is greater than an upper threshold, for example, 75% of maximum load, as compared to a load that is greater than a lower threshold.

At 310 the method may include determining whether the engine is operating in a gaseous fuel mode. For vehicles that run solely on CNG or another gaseous fuel, the vehicle may be assumed to be operating in a gaseous fuel mode, for example operating on a first gaseous fuel that is one or more of CNG and methane. For bi-fuel, multi-fuel or hybrid engines, the method may include determining the current rate of gaseous fuel usage. If the engine is not operating in a gaseous fuel mode, method 300 may proceed to 312. At 312, method 300 may include maintaining the current injection profile. Method 300 may then end. If the engine is operating in a gaseous fuel mode, or if gaseous fuel usage is above a threshold, method 300 may proceed to 315.

At 315, method 300 may include measuring or estimating the quality and quantity of gaseous fuel remaining in a fuel tank. The quantity of fuel may be measured using a pressure sensor coupled to the fuel tank or fuel line containing the gaseous fuel. The quality of gaseous fuel may include the octane, ignitability, purity, etc. and may be measured by one or more on-board sensors, estimated based on measured engine operating conditions, inferred or determined at a refueling event, or evaluated through other means.

At 320, method 300 may include setting a gaseous fuel injection profile as a function of the conditions, measurements and estimations discussed above. The fuel injection profile may include a quantity of fuel injected and may include a timing of fuel injection relative to the combustion cycle of the engine. Example fuel injection profiles are discussed further below and with regards to FIGS. 4-8. The fuel injection profile may in turn be executed by a controller delivering signals to a fuel injector, and further regulating the pressure of gaseous fuel in a fuel rail or fuel line by regulating a pump or aspirator. The fuel injection profile may be a function of a desired AFR. For example, the quantity of fuel injected may be increased in order to increase maximum power by running rich, or decreased in order to maximize fuel economy by running lean.

At 325, method 300 may include measuring or estimating the quality and quantity of a secondary injectant. As discussed above and with regard to FIG. 2, the secondary injectant may be a secondary fuel source contained in a fuel tank. For example, in a bi-fuel vehicle, the secondary injectant may be gasoline. The second liquid fuel may be one or more of a methanol solution and an ethanol solution. In some embodiments, the secondary injectant may be a diluent contained in a reservoir. For example, the secondary injectant may be a methanol solution or windshield wiper fluid contained in a windshield wiper fluid tank. In some examples, there may be multiple secondary injectants available, for example gasoline and methanol solution. In such examples, all possible secondary injectants may be evaluated. Alternatively, if the secondary injectants have vastly different properties, the quantity and quality of one or more secondary injectants may be evaluated depending on the engine operating conditions and desired effect of the secondary injection.

At 330, method 300 may include setting a secondary injection profile as a function of the conditions, measurements and estimations discussed above. The secondary injection profile may include a quantity of fuel and/or diluent injected and may include a timing of a secondary injection relative to the combustion cycle of the engine and relative to the timing of the primary fuel injection. Example secondary injection profiles are discussed further below and with regards to FIGS. 4-8. The secondary injection profile may in turn be executed by a controller delivering signals to a fuel injector, and further regulating the pressure of fuel or diluent in a fuel rail, fuel line or delivery line by regulating a pump or aspirator. For example, a diluent may be injected to increase the density of a gas charge entering a combustion chamber, or to decrease the temperature of exhaust gas exiting the cylinder. A diluent may be injected to alter the AFR in a combustion chamber. For example, a first quantity of a first gaseous fuel injected may generate operation of the engine with a substantially stoichiometric AFR, and a second quantity of a second liquid fuel injected may lower the AFR to a substantially rich AFR. In another example a first quantity of a first gaseous fuel may allow operation of the engine with a substantially lean AFR, and a second quantity of a second liquid fuel injected may lower the AFR to a substantially stoichiometric AFR. Note that stoichiometric AFR and substantially stoichiometric AFR may refer to an AFR within 10% of the AFR for engine operation at stoichiometry.

At 335, method 300 may include adjusting the spark timing and boost pressure as a function of the engine conditions and the injection profiles of gaseous fuel and secondary injectant. This may include advancing or retarding the spark timing and increasing or decreasing the boost pressure. Spark timing adjusting and boost pressure setting may be implemented by a controller, and may implement a lookup map to select the optimal spark timing and boost pressure for a current set of operating conditions.

The fuel injection profile, secondary injection profile, spark timing and boost pressure may be implemented with a lookup map where desired engine performance qualities are mapped to injection profiles and spark timing profiles and as a function of the quality and quantity of fuel and secondary injectant available. The fuel injection profile, secondary injection profile, spark timing and boost pressure may be determined sequentially and as a function of each other, or may be determined concurrently, for example, through a lookup map. For example, the secondary injection profile may be determined as a function of the boost pressure. The fuel injection profile, secondary injection profile, spark timing and boost pressure may be set iteratively through a feedback loop and may further be continuously updated as a function of vehicle speed, engine load, or other engine operating conditions.

Figure 4:
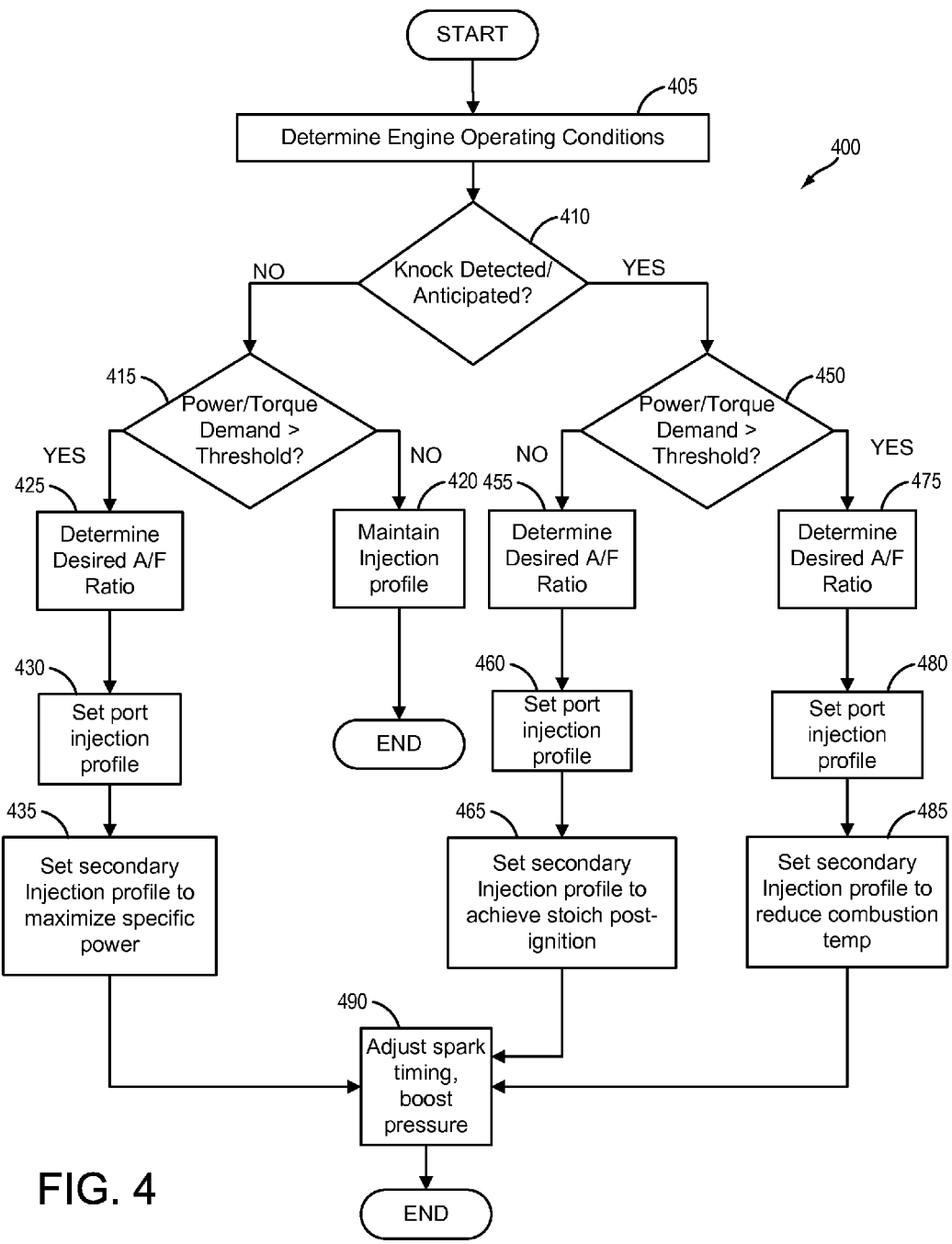
FIG. 4 depicts an example flow chart for operating a port-fuel injection system and a secondary direct injection system as a function of engine operating conditions.
Figure 5:
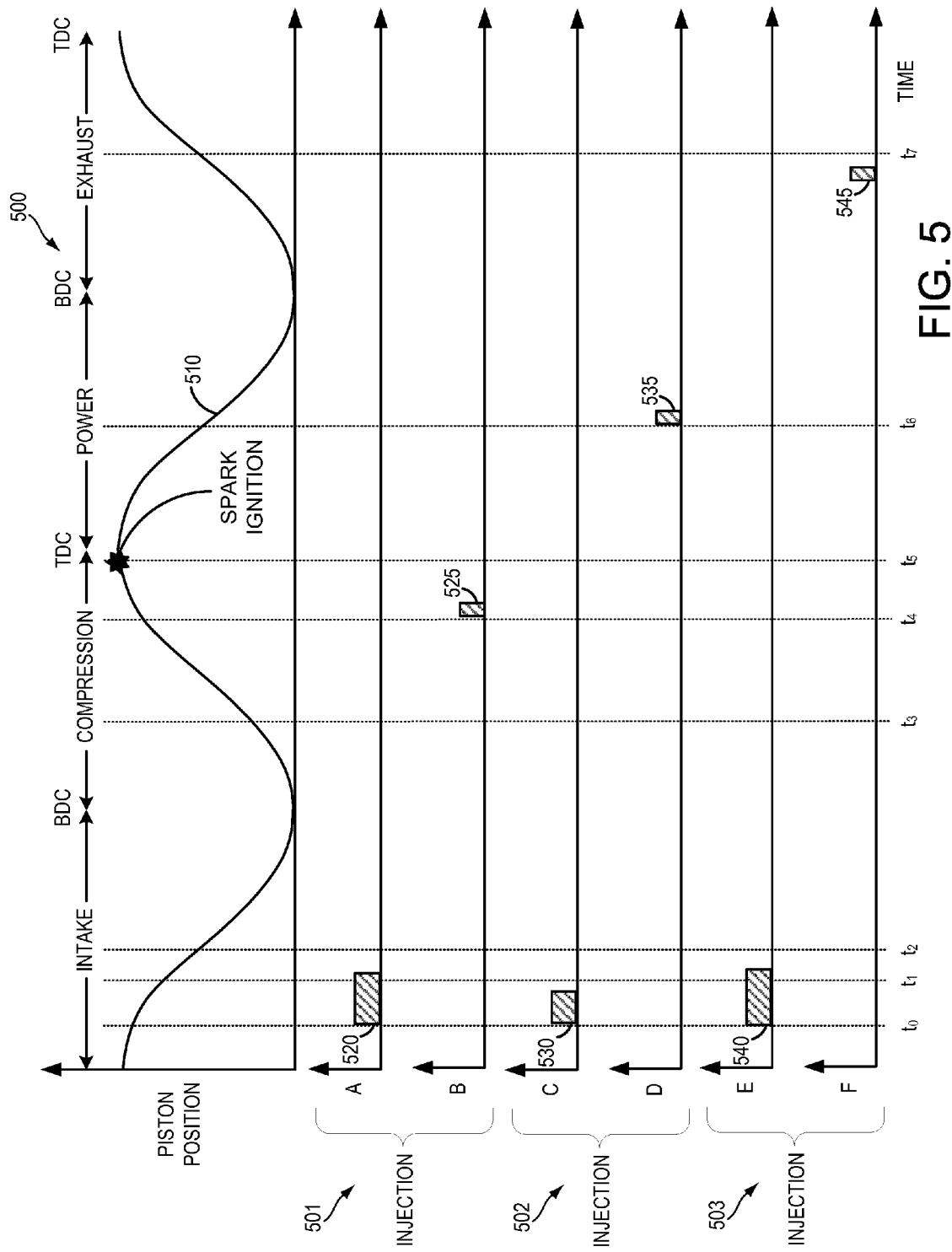
FIG. 5 is a graphical representation of an example timeline for vehicle operation and the operation of a port-fuel injection system and secondary direct injection system according to the present disclosure.

FIG. 4 shows a flowchart depicting method 400 in accordance with the present disclosure. Method 400 may be carried out by controller 12. Method 400 may be implemented as a subroutine of another method, for example method 300. In particular, method 400 may be implemented in a gaseous fueled, bi-fueled or multi-fueled vehicle comprising a reservoir of a secondary injectant, for example, the system depicted in FIG. 2. Method 400 may be executed as part of a routine to mitigate engine knock, a routine to maximize specific power, or to otherwise control the ignition cycle of an engine. Method 400 will be described herein with reference to a vehicle comprising a turbocharged CNG engine and a reservoir of water, methanol solution or ethanol solution, but it is to be understood that the method could be implemented in other vehicles without departing from the scope of this disclosure.

Method 400 may begin at 405 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc. At 410, method 400 may include determining if engine knock is currently detected, or if operating conditions anticipate engine knock occurring unless one or more engine parameters are altered. For example, engine knock may be detected by a knock sensor. In some examples, engine knock may be anticipated as a function of cylinder pressure, cylinder temperature, engine operating conditions, fuel quality, etc.

If engine knock is not detected or anticipated, method 400 may proceed to 415. At 415, method 400 may include determining whether the current torque demand or current horsepower demand is greater than a threshold. The threshold(s) may be predetermined values, or may be calculated as a function of current engine operating conditions. In some examples, it may be possible to predict or anticipate an increase in torque or horsepower demand, for example, an on-board GPS may sense an approaching incline that would draw increased torque or horsepower to maintain the current vehicle speed.

If the current torque and horsepower demands are less than the threshold(s), method 400 may proceed to 420, where the method may include maintaining the current injection profile. When the current injection profile has been maintained, method 400 may end.

If the current torque and/or horsepower demands are greater than the threshold(s), method 400 may proceed to 425. At 425, method 400 may include determining a desired AFR. For example, an increase in torque demand may indicate that the AFR may be decreased from the current AFR and biased towards a rich-burning ratio. At 430, method 400 may include setting the port fuel injection profile. The port fuel injection profile may include the timing and quantity of gaseous fuel to be port injected into the intake manifold.

At 435, method 400 may include setting the secondary injection profile to maximize specific power. For example, specific power may be maximized by direct-injecting a quantity of secondary injectant following port injection of the gaseous fuel and prior to spark ignition. Example injection profiles are depicted in FIG. 5.

FIG. 5 depicts example timing plots for port fuel injection and secondary injection profiles relative to an engine combustion cycle. Curve 510 represents piston position for one cylinder undergoing a four-stroke engine cycle, including intake, compression, power and ignition strokes. The plot may be considered to loop indefinitely. In this example, the exhaust valve opens at time point $t_7$ and closes at time point $t_2$. The intake valve opens at time $t_1$ and closes at time $t_3$. Spark ignition occurs at time $t_5$. Spark ignition is shown as occurring at a few degrees prior to the piston reaching top dead center (TDC), but may be advanced or retarded depending on engine operating conditions.

A timing plot 501 is shown for setting an injection profile to maximize specific power, as described above with regards to FIG. 4. Timing plot 501 includes injection profile A and injection profile B. Injection profile A is a port injection profile for port injecting CNG. Injection profile B is a direct injection profile for direct injecting a secondary injectant, such as water or methanol solution. Block 520 represents port injection of CNG. In this example, the port injection of CNG begins at a time point ($t_0$) during the intake stroke, but prior to the opening of the intake valve at $t_1$. Block 525 represents direct injection of methanol solution. In this example, the direct injection of methanol solution occurs at a time point ($t_4$) during the compression stroke, but prior to spark ignition. In this way, CNG may be port-injected at a stoichiometry or rich AFR. In this way, the injection of methanol solution prior to spark ignition may lower the effective AFR and allow for a richer burning than for CNG alone. Rich burning of CNG/methanol solution may allow for specific power of the engine to be maximized in response to an increased demand for torque or horsepower.

Herein, operating an engine at a stoichiometry (or stoichiometric) AFR may refer to AFR that are substantially stoichiometric over time. For example, an engine may operate within 5% of a stoichiometric ratio and be considered stoichiometric, or the AFR may oscillate within 5% above and below a stoichiometric AFR and be considered stoichiometric for the purposes of this disclosure.

Operating an engine at a rich AFR may refer to AFRs that are richer than stoichiometric AFRs as described above. An engine may oscillate between two rich AFRs over time and be considered operating at a substantially rich AFR as long as there are no excursions to a lean AFR.

Similarly, operating an engine at a lean AFR may refer to AFR that are leaner than stoichiometric AFRs as described above. An engine may oscillate between two lean AFRs over time and be considered operating at a substantially lean AFR as long as there are no excursions to a rich AFR.

Returning to FIG. 4, if engine knock is detected or anticipated at 410, method 400 may proceed to 450. At 450, method 400 may include determining whether the current torque demand or current horsepower demand is greater than a threshold. As described above, the threshold(s) may be predetermined values, or may be calculated as a function of current engine operating conditions. In some examples, it may be possible to predict or anticipate an increase in torque or horsepower demand.

If it is determined that the current torque and/or horsepower demands are greater than the threshold(s), method 400 may proceed to 455. At 455, method 400 may include determining a desired AFR. For example, if the engine is knocking or about to knock, and a low torque demand is required, a lean AFR may be desired. At 460, method 400 may include setting the port fuel injection profile. The port fuel injection profile may include the timing and quantity of gaseous fuel to be port injected into the intake manifold.

At 465, method 400 may include setting the secondary injection profile to achieve a stoichiometric AFR. For example, methanol solution may be injected following ignition and during the power stroke to reduce the AFR within the cylinder.

An example injection profile for the above condition is depicted by timing plot 502 in FIG. 5. Timing plot 502 includes injection profile C and injection profile D. Injection profile C is a port injection profile for port injecting CNG. Injection profile D is a direct injection profile for direct injecting a secondary injectant, such as water or methanol solution. Block 530 represents port injection of CNG. In this example, the port injection of CNG begins at a time point ($t_0$) during the intake stroke, but prior to the opening of the intake valve at $t_1$. In this example, block 530 represents a quantity of CNG that would result in a lean-burning AFR. Block 535 represents direct injection of methanol solution. In this example, the direct injection of methanol solution occurs at a time point ($t_6$) during the power stroke, following spark-ignition. In this way, CNG may be port-injected at a lean AFR to avoid engine knock, and methanol solution may be direct injected to control the AFR to be substantially stoichiometric during combustion.

Returning to FIG. 4, at 450 if it is determined that the current torque and/or horsepower demands are greater than the threshold(s), method 400 may proceed to 475. At 475, method 400 may include determining a desired AFR. For example, if the engine is knocking or about to knock, and a high torque demand is required, a rich AFR may be desired. At 480, method 400 may include setting the port fuel injection profile. The port fuel injection profile may include the timing and quantity of gaseous fuel to be port injected into the intake manifold.

At 485, method 400 may include setting the secondary injection profile to reduce combustion temperature. For example, methanol solution may be injected following combustion and during the exhaust stroke to reduce the temperature of exhaust exiting the cylinder.

An example injection profile for the above condition is depicted by timing plot 503 in FIG. 5. Timing plot 503 includes injection profile E and injection profile F. Injection profile E is a port injection profile for port injecting CNG. Injection profile F is a direct injection profile for direct injecting a secondary injectant, such as water or methanol solution. Block 540 represents port injection of CNG. In this example, the port injection of CNG begins at a time point ($t_0$) during the intake stroke, but prior to the opening of the intake valve at $t_1$. In this example, block 540 represents a quantity of CNG that would result in a stoichiometry or rich-burning AFR. Block 545 represents direct injection of methanol solution. In this example, the direct injection of methanol solution occurs at a time point ($t_4$) during the exhaust stroke, but prior to opening of the exhaust valve. In this way, CNG may be port-injected at a stoichiometry or rich AFR to maximize engine power, and methanol solution may be direct injected to cool the temperature of the combustion cylinder and accompanying exhaust gas exiting the combustion cylinder, thereby mitigating engine knock. In some examples, the direct injection of methanol solution may overlap with the opening of the exhaust valve, or may begin following the opening of the exhaust valve. Multiple direct injections of methanol solution may occur during an engine cycle. For example, a first injection may occur at time point t4, followed by a second injection at time point t7. In this way, specific engine power may be maximized while maintaining engine temperature below a threshold and while also mitigating engine knock.

Returning to FIG. 4, when the port injection profile and secondary injection profile have been set, method 400 may proceed to 490. At 490, method 400 may include adjusting spark timing and/or adjusting boost pressure.

The port injection profile, secondary injection profile, spark timing and boost pressure may be implemented with a lookup map where desired engine performance qualities are mapped to injection profiles and spark timing profiles and as a function of the quality and quantity of fuel and secondary injectant available. The fuel injection profile, secondary injection profile, spark timing and boost pressure may be determined sequentially and as a function of each other, or may be determined concurrently, for example, through a lookup map. For example, the secondary injection profile may be determined as a function of the boost pressure. The fuel injection profile, secondary injection profile, spark timing and boost pressure may be set iteratively through a feedback loop and may further be continuously updated as a function of vehicle speed, engine load, desired AFR, engine knock or other engine operating conditions.

Figure 6:
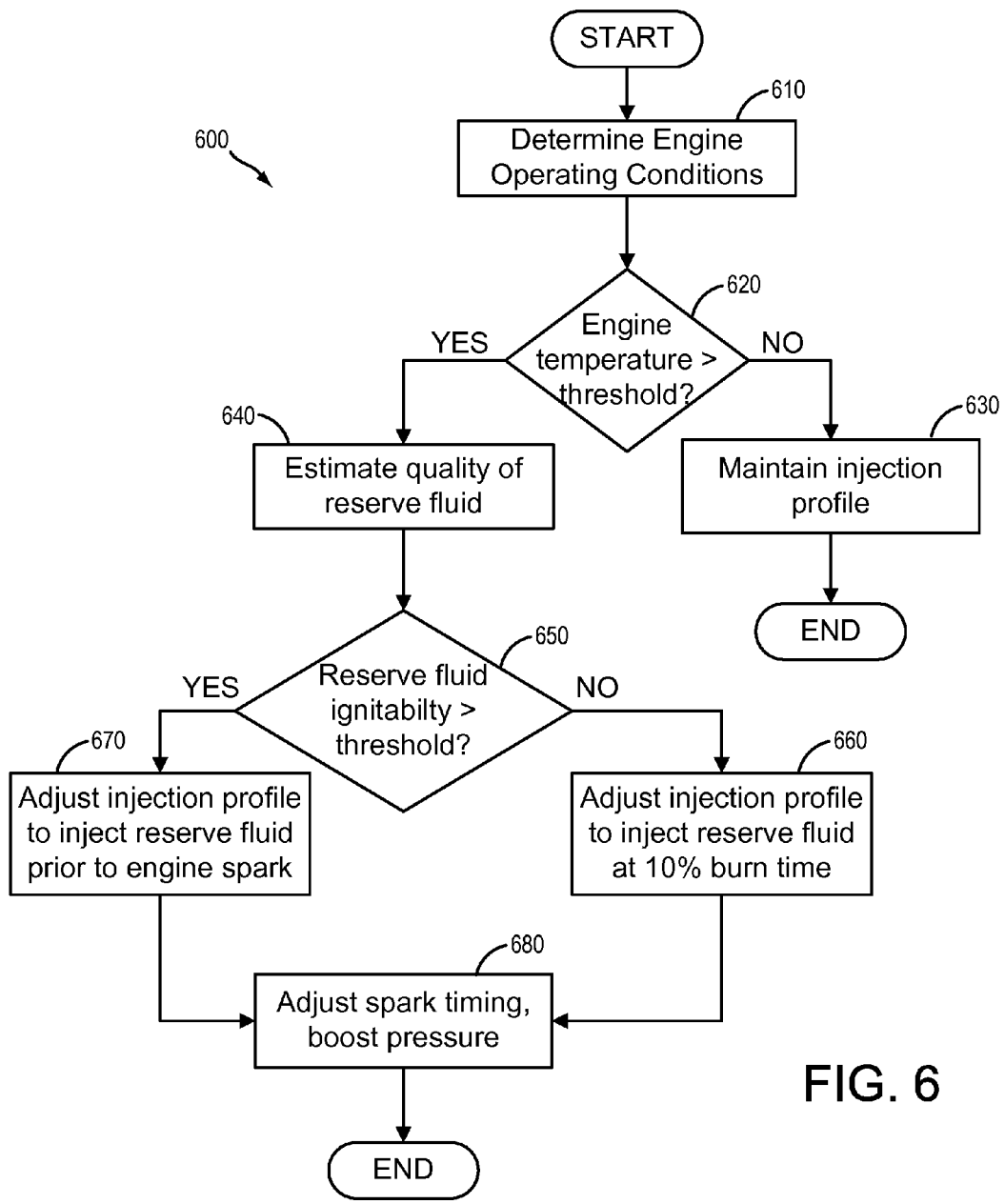
FIG. 6 depicts an example flow chart for operating a port-fuel injection system and a secondary direct injection system as a function of the ignitability of a reserve fluid.
Figure 7:
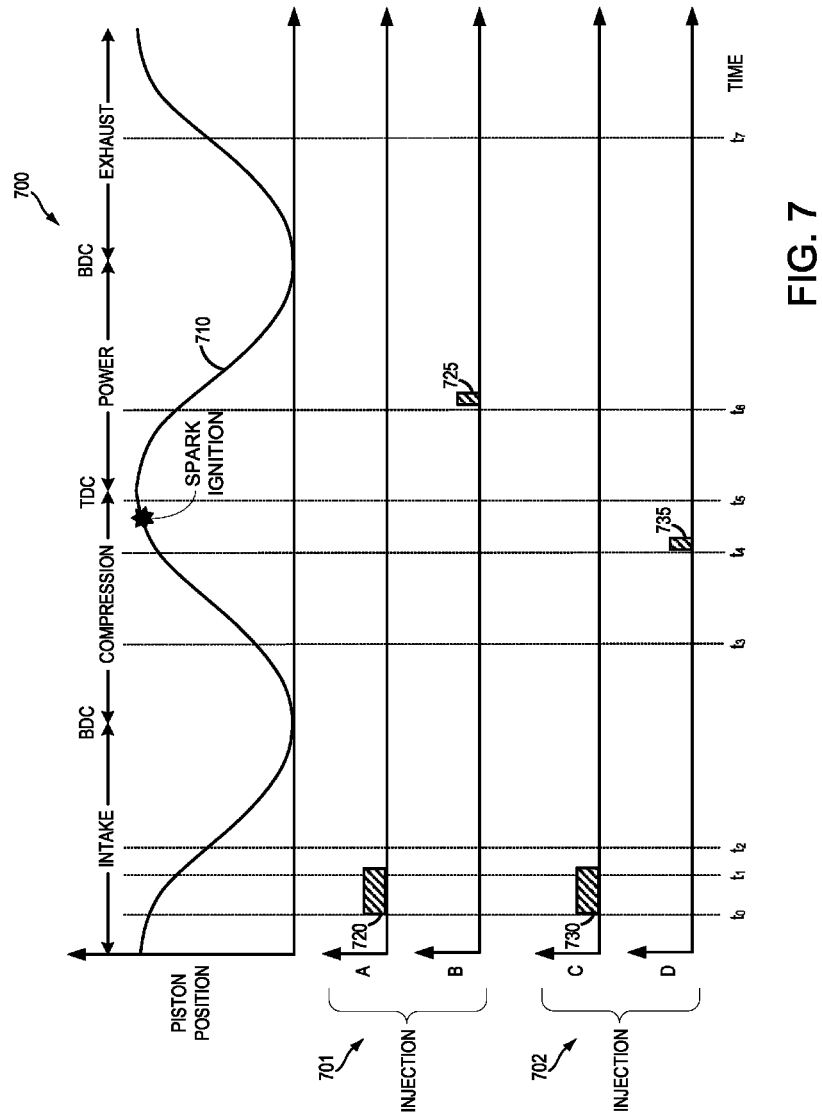
FIG. 7 is a graphical representation of an example timeline for vehicle operation and the operation of a port-fuel injection system and secondary direct injection system according to the present disclosure.

FIG. 6 shows a flowchart depicting method 600 in accordance with the present disclosure. Method 600 may be carried out by controller 12. Method 600 may be implemented as a subroutine of another method, for example method 300. In particular, method 600 may be implemented in a gaseous fueled, bi-fueled or multi-fueled vehicle comprising a reservoir of a secondary injectant, for example, the system depicted in FIG. 2. Method 600 may be executed as part of a routine to mitigate engine knock, a routine to maximize specific power, or to otherwise control the ignition cycle of an engine. Method 600 will be described herein with reference to a vehicle comprising a turbocharged CNG engine and a reservoir that may hold one of a plurality of secondary injectants with differing properties, but it is to be understood that the method could be implemented in other vehicles without departing from the scope of this disclosure.

Method 600 may begin at 610 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc.

At 620, method 600 may include determining whether the engine temperature is greater than a threshold. The threshold may be a predetermined temperature, or may be determined as a function of engine operating conditions. In some embodiments, exhaust temperature may be compared to a threshold in addition to, or instead of engine temperature. If the engine temperature is below the threshold, method 600 may move to 630. At 630, method 600 may include maintaining the current injection profile. When the current injection profile has been maintained, method 600 may end.

If the engine temperature is above the threshold, method 600 may proceed to 640. At 640, method 600 may include measuring or estimating the quality of reserve fluid. As discussed above and with regard to FIGS. 2 and 3, the secondary injectant may be a secondary fuel source contained in a fuel tank. For example, in a bi-fuel vehicle, the secondary injectant may be gasoline. In another example, the secondary injectant may be a diluent contained in a reservoir. For example, the secondary injectant may be a methanol solution contained in a windshield washer fluid tank. In some examples, there may be multiple secondary injectants available, for example gasoline and methanol solution. In such examples, all possible secondary injectants may be evaluated. Alternatively, if the secondary injectants have vastly different properties, the quantity and quality of one or more secondary injectants may be evaluated depending on the engine operating conditions and desired effect of the secondary injection.

At 650, method 600 may include comparing the ignitability of the reserve fluid to a threshold. If the reserve fluid has ignitability below the threshold, method 600 may proceed to 660. At 660, method 600 may include adjusting an injection profile to inject a quantity of reserve fluid at 10% burn time. In other words, a secondary injectant with a low ignitability may be injected at a predetermined time following spark ignition.

If the reserve fluid has ignitability above the threshold, method 600 may proceed to 670. At 670, method 600 may include adjusting an injection profile to inject a quantity of reserve fluid prior to spark ignition. In other words, a secondary injectant with a high ignitability may be injected at a predetermined time prior to spark ignition.

When the injection profile has been adjusted as a function of secondary injectant ignitability, method 600 may proceed to 680. At 680, method 600 may include adjusting spark timing and/or adjusting boost pressure.

The secondary injection profile, spark timing and boost pressure may be implemented with a lookup map where desired engine performance qualities are mapped to injection profiles and spark timing profiles and as a function of the quality and quantity of fuel and secondary injectant available. The secondary injection profile, spark timing and boost pressure may be determined sequentially and as a function of each other, or may be determined concurrently, for example, through a lookup map. The secondary injection profile, spark timing and boost pressure may be set iteratively through a feedback loop and may further be continuously updated as a function of vehicle speed, engine load, desired AFR, engine knock or other engine operating conditions.

For example, the timing of the secondary injection may be adjusted as a function of the boost pressure. For a secondary injectant with a relatively low ignitability, the timing of the secondary injection following spark ignition may be inversely proportionate to boost pressure. In other words, at a high boost pressure, the timing may be adjusted to be closer to spark ignition than for a lower boost pressure, where the timing of injection may be further from spark ignition.

FIG. 7 depicts an example timing plot 700 for port fuel injection and secondary injection profiles relative to an engine combustion cycle. Curve 710 represents piston position for one cylinder undergoing a four-stroke engine cycle, including intake, compression, power and ignition strokes. The plot may be considered to loop indefinitely. In this example, the exhaust valve opens at time point $t_7$ and closes at time point $t_2$. The intake valve opens at time $t_1$ and closes at time $t_3$. Spark ignition occurs at time $t_5$. Spark ignition is shown as occurring at a few degrees prior to the piston reaching top dead center (TDC), but may be advanced or retarded depending on engine operating conditions.

An injection plot 701 is shown for setting an injection profile for a secondary injectant with low ignitability, as described above with regards to FIG. 6. Timing plot 701 includes injection profile A and injection profile B. Injection profile A is a port injection profile for port injecting CNG. Injection profile B is a direct injection profile for direct injecting a secondary injectant with low ignitability, such as water or methanol solution. Block 720 represents port injection of CNG. In this example, the port injection of CNG begins at a time point ($t_0$) during the intake stroke, but prior to the opening of the intake valve at $t_1$. Block 725 represents direct injection of methanol solution. In this example, the direct injection of methanol solution occurs at a time point ($t_6$) during the power stroke, following spark ignition and following 10% burn time. In this way, the injection of methanol solution following spark ignition may lower the effective AFR and allow for a richer burning than for CNG alone. By injecting methanol solution at time $t_6$, the poor ignitability of methanol solution does not affect establishment of a flame kernel. The expansion work done by the combustion event may increase, and the temperature of the exhaust may decrease. In some examples, the injection timing may be delayed proportionally to a decrease in the ignitability of the liquid fuel or diluent, while the injection time point is after flame kernel formation. The timing of the injection of methanol solution may occur between spark ignition and TDC. In this way, rich burning of CNG/methanol solution may allow for specific power of the engine to be maximized in response to an increased demand for torque or horsepower, while also mitigating engine knock by decreasing the maximum combustion temperature.

An injection plot 702 is shown for setting an injection profile for a secondary injectant with high ignitability, as described above with regards to FIG. 6. Timing plot 702 includes injection profile C and injection profile D. Injection profile C is a port injection profile for port injecting CNG. Injection profile D is a direct injection profile for direct injecting a secondary injectant with high ignitability, such as $H_2$, CO, or gasoline. Block 730 represents port injection of CNG. In this example, the port injection of CNG begins at a time point ($t_0$) during the intake stroke, but prior to the opening of the intake valve at $t_1$. Block 735 represents direct injection of gasoline. In this example, the direct injection of gasoline occurs at a time point ($t_4$) during the compression stroke, prior to spark ignition. In this way, the injection of gasoline prior to spark ignition may lower the effective AFR and allow for a richer burning than for CNG alone. Rich burning of CNG/gasoline may allow for specific power of the engine to be maximized in response to an increased demand for torque or horsepower, while also mitigating engine knock by decreasing the maximum combustion temperature.

Figure 8:
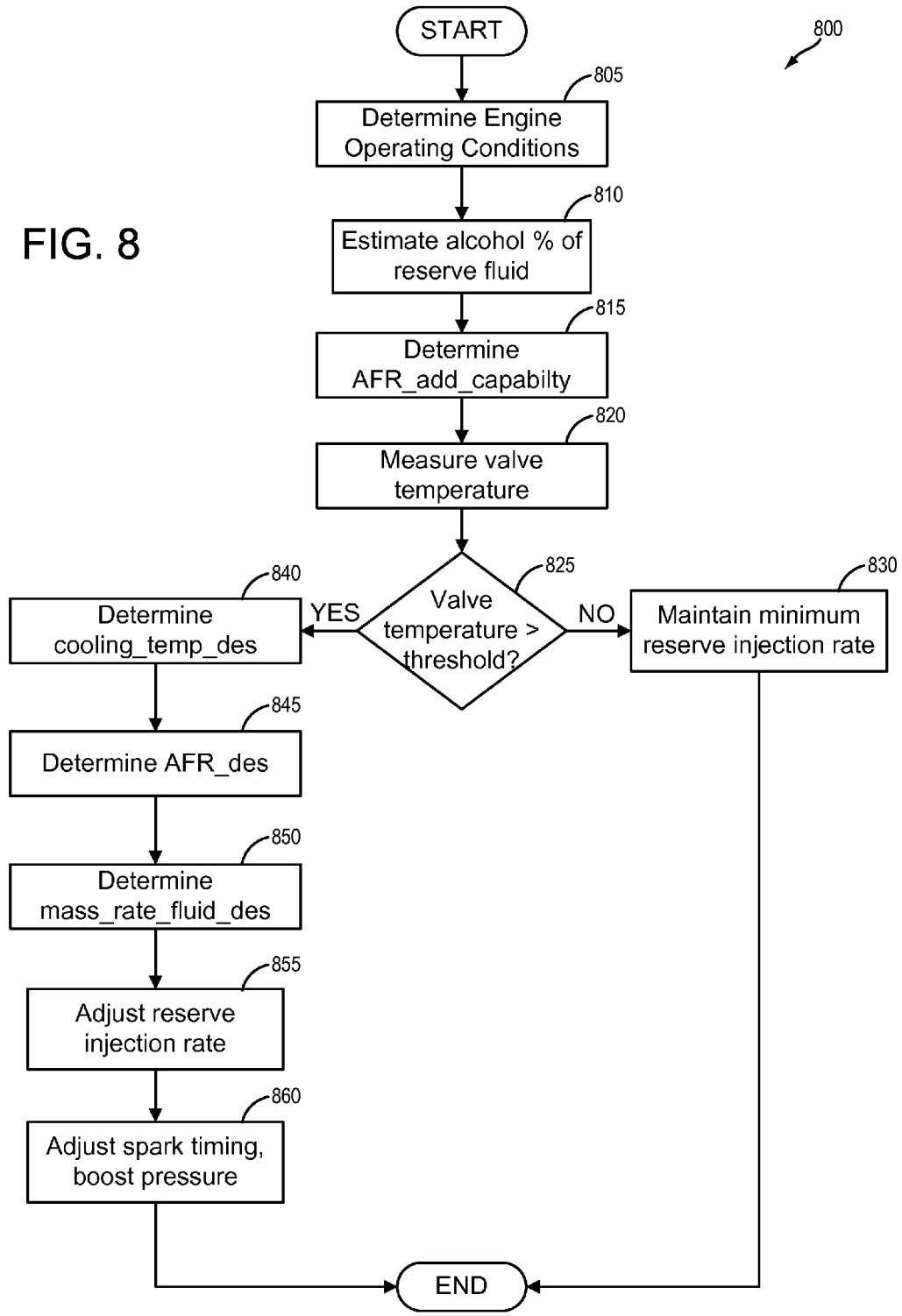
FIG. 8 depicts an example flow chart for adjusting the rate of a secondary injection.

FIG. 8 shows a flowchart depicting method 800 in accordance with the present disclosure. Method 800 may be carried out by controller 12. Method 800 may be implemented as a subroutine of another method, for example method 300. In particular, method 800 may be implemented in a gaseous fueled, bi-fueled or multi-fueled vehicle comprising a reservoir of a secondary injectant, for example, the system depicted in FIG. 2. Method 800 may be executed as part of a routine to mitigate engine knock, a routine to maximize specific power, or to otherwise control the ignition cycle of an engine. Method 800 will be described herein with reference to a vehicle comprising a turbocharged CNG engine and a reservoir that may hold a methanol or ethanol solution, but it is to be understood that the method could be implemented in other vehicles without departing from the scope of this disclosure.

Method 800 may begin at 805 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc.

At 810, method 800 may include measuring or estimating the amount of alcohol of a secondary injectant held in a reserve tank. For example, the alcohol percentage may be measured as a function of vapor pressure and fluid volume in the reserve tank, or may be estimated based on the qualities of a commercial product, such as a windshield wiper fluid.

At 815, method 800 may include determining a value for an AFR that is achievable with injection of the secondary injectant as a function of the alcohol percentage of the secondary injectant. This value may be referred to as AFR_add_capability. The secondary injectant may be used to allow richer AFR combustion than with CNG alone. The combustion profile and maximum AFR for CNG+injectant may be determined as a function of the alcohol percentage of the secondary injectant. For example, 100% methanol has a very wide AFR window, whereas 20% methanol has a narrower AFR window.

At 820, method 800 may include measuring valve temperature in a cylinder. This may include measuring the temperature of a valve or valve seat, or estimating the valve temperature based on engine conditions, such as exhaust temperature. Valve temperature may be measured or estimated for an intake valve, exhaust valve or both. Valve temperature may be measured or estimated for each valve of a multi-cylinder engine or may be measure or estimated for the engine as a whole.

At 825, method 800 may include determining whether the valve temperature measured or estimated at 820 is greater than a threshold. The threshold may be predetermined, or may be calculated as a function of current engine operating conditions. If the valve temperature is not above the threshold, method 800 may proceed to 830. At 830, method 800 may include maintaining a minimum reserve injection rate. The minimum reserve injection rate may be a function of a quality of the reserve fluid, for example, the alcohol percentage of the reserve fluid. The minimum reserve injection rate may be set to the minimum rate able to produce a minimum quantity of soot during a combustion cycle in order to act as an exhaust valve lubricant.

If the valve temperature is above the threshold, method 800 may proceed to 840. At 840, method 800 may include determining the cooling temperature required as a function of valve temperature. The cooling temperature desired may be referred to herein as cooling_temp_des and may be a temperature required to maintain valve temperature at a certain value below the threshold temperature as a function of current engine operating conditions.

At 845, method 800 may include determining a desired AFR. The desired AFR may be referred to herein as AFR_des, and may be a function of AFR_add_capability, cooling_temp_des, and other engine operating conditions. The value of AFR_des may be set as an AFR able to achieve rich combustion and lower combustion temperature.

At 850, method 800 may include determining a secondary injection rate needed to achieve AFR_des as a function of engine operating conditions. The secondary injection rate may be referred to herein as mass_rate_fluid_des and may be a function of the alcohol percentage of the reserve fluid, of AFR_add_capability, cooling_temp_des, engine speed, engine load, and other engine operating conditions.

At 855, method 800 may include adjusting the reserve injection rate, such that the injection rate is a function of mass_rate_fluid_des. The injection rate may be adjusted indefinitely, or commanded to adjust until valve temperature has decreased below a threshold value.

When the injection profile has been adjusted as a function of secondary injectant ignitability, method 800 may proceed to 860. At 860, method 800 may include adjusting spark timing and/or adjusting boost pressure.

The reserve injection profile, spark timing and boost pressure may be implemented with a lookup map where desired engine performance qualities are mapped to injection profiles and spark timing profiles and as a function of the quality and quantity of fuel and reserve injectant available. The reserve injection profile, spark timing and boost pressure may be determined sequentially and as a function of each other, or may be determined concurrently, for example, through a lookup map. For example, the secondary injection profile may be determined as a function of the boost pressure. The reserve injection profile, spark timing and boost pressure may be set iteratively through a feedback loop and may further be continuously updated as a function of vehicle speed, engine load, desired AFR, engine knock or other engine operating conditions.

Figure 9:
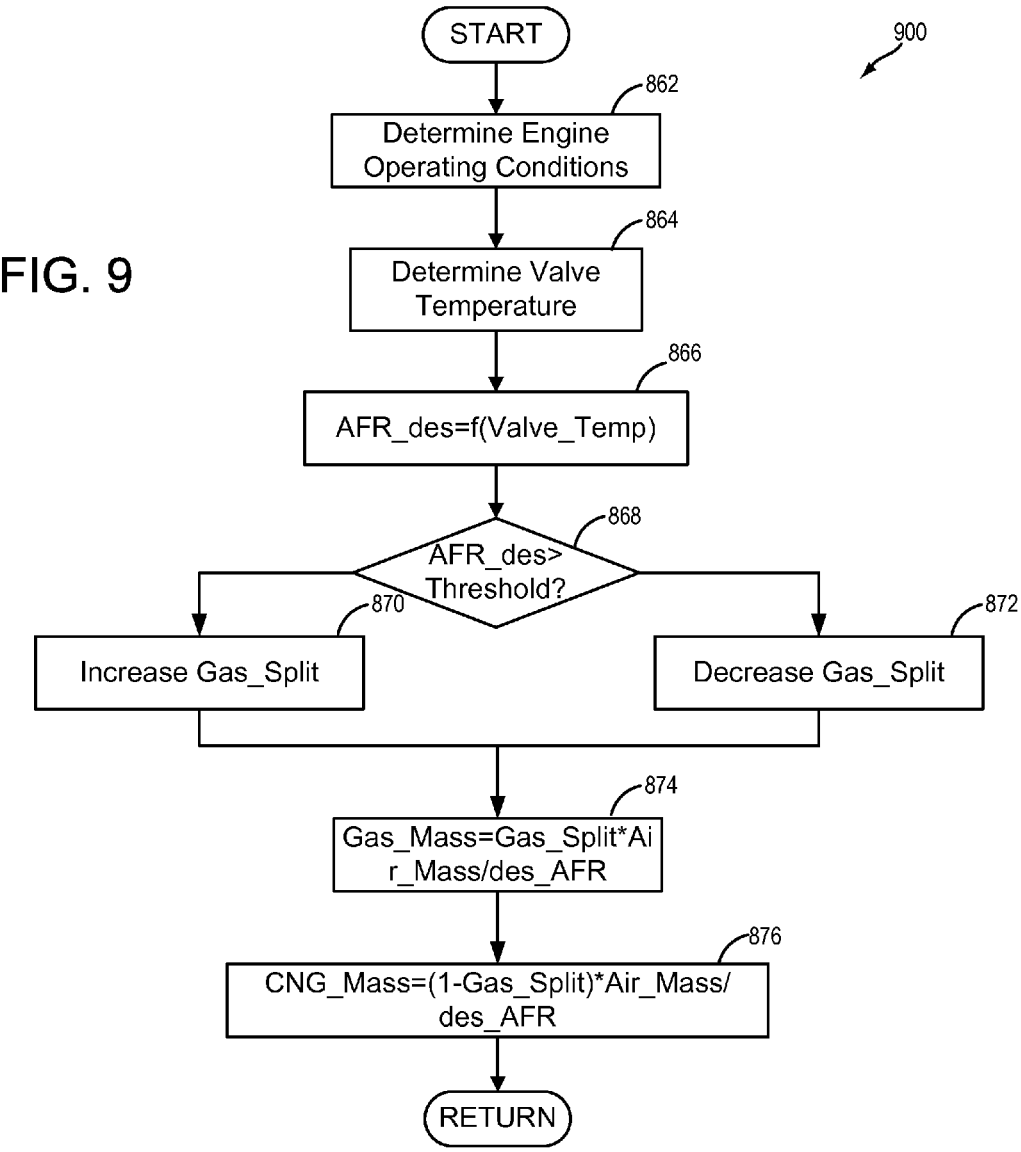
FIG. 9 depicts an example flow chart for adjusting the AFR using a secondary injection.

FIG. 9 shows a flowchart depicting method 900 in accordance with the present disclosure. Method 900 may be carried out by controller 12. Method 900 may be implemented as a subroutine of another method, for example method 300. In particular, method 900 may be implemented in a gaseous fueled, bi-fueled or multi-fueled vehicle comprising a reservoir of a secondary injectant, for example, the system depicted in FIG. 2. Method 900 may be executed as part of a routine to mitigate valve recession.

Valve wear and valve seat recession is the degradation of engine valves over time and operation. The high temperatures and repetitive opening and closing of valves can degrade the interface between a valve and valve seat, leading to improper valve seating. Valve wear is most pronounced in exhaust valves that experience the highest heat absorption from exhaust gas.

In natural gas engines, valve wear is increased due to the higher specific heat of natural gas in comparison to liquid hydrocarbon fuel. CNG engines also experience relatively complete combustion, causing a low rate of soot production to provide exhaust valve lubrication, thermal insulation, or microwelding. The decreased hydrocarbon content and completeness of combustion in natural gas engines also contribute to the lack of protective soot production.

Engines retro-fitted for natural gas fueled operation are particularly susceptible to valve wear as they may not be designed to sustain the increased temperature of CNG operation. The pre-existing lubrication methods may also be insufficient for CNG operation. Further, partially combusted hydrocarbon may create soot to insulate and lubricate the engine valves and valve seats. Thus the protective benefits of the embodiment are compounded when liquid fuel is used as a secondary injectant.

Method 900 will be described herein with reference to a vehicle comprising a turbocharged CNG engine and a reservoir that may hold a methanol or ethanol solution, but it is to be understood that the method could be implemented in other vehicles without departing from the scope of this disclosure. Method 900 may begin at 862 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc. Operating conditions may also include the current AFR and the current value of NG to secondary injectant (Gas_Split) being injected into the engine. The mass of air injected into the engine cylinders may also be determined and will be referred to below as Air_Mass.

At 864, method 900 may include measuring or estimating the temperature of an engine valve. Valve temperature (Valve_Temp) may be measured directly using a temperature sensor located on or near the valve. It may also be inferred from other operating conditions such as engine load, speed, or temperature sensor output in another part of the engine system such as the exhaust system.

At 866 a desired AFR may be determined based on the current valve temperature. The AFR may be determined so as to keep the valve temperature within a desired operating range. This range may correspond to an engine temperature that contributes to valve recession or engine knock.

In other embodiments, (not shown) the method may terminate after 864 if the valve temperature is not above a threshold. Secondary injectant may thus be added when the valve temperature is at or near an overheat threshold.

At 868, it may be determined if the desired AFR is above a threshold. This threshold may correspond to the desired AFR that was determined in the last repetition of the method. In other words, if the desired AFR richness increases the threshold is met, if the desired AFR richness remains the same or decreases the threshold is not met. The threshold may also correspond to an AFR achievable via natural gas alone or via the ratio of natural gas and secondary injectant that is currently being injected. If the AFR desired is not achievable with the current natural gas to secondary fuel injectant available, the threshold is met. The current AFR may be one of the operating conditions measured at 862.

If the threshold is met, a Gas_Split ratio may be increased at 870 if the threshold is not met the Gas_Split ratio may be decreased. Note that method 900 may be initiated during engine operation or at the start of engine operation and may loop throughout engine operation. The first iteration of method 900 may use a predetermined value for Gas_Split such that, when the method reaches 870 and 872 Gas_Split may be increased or decreased from this predetermined Gas_Split value. The predetermined value may be zero. Further, this predetermined value may be determined by the control system prior to step 870 and may be a function of the desired AFR found at 866.

At 874 a mass of secondary injectant may be determined. The secondary injectant may be gas. The mass to be injected may be proportional to Gas_Split ratio determined at 870 or 872 as well as the Air_Mass determined at 862 and may be inversely proportional to the AFR richness desired. At 876 an amount of CNG to be injected into the engine may be determined. This may be proportional to the difference between the gas split ratio and one as the Air_Mass and may be inversely proportional to the desired AFR. Method 900 may then repeat.

The secondary injectant may be used to allow richer AFR combustion than with CNG alone. The combustion profile and maximum AFR for CNG+injectant may be determined as a function of the alcohol percentage of the secondary injectant. For example, 100% methanol has a very wide AFR window, whereas 20% methanol has a narrower AFR window. Richer AFR and thus cooler engine operation may help to abate valve wear.

In some embodiments, an engine may have a natural gas tank and a gasoline tank. In retrofitted engines, designed to make engines robust with natural gas, a gasoline tank and delivery system may be adapted to inject gasoline into the retrofitted engine. In embodiments a desired AFR may be determined in response to operating conditions and load demands as well as engine valve temperature. Engine valve temperature may be measured directly or determined based on information acquired by the control system such as engine load and speed. In some embodiments, AFR may be a function of valve temperature and not desired torque, engine speed, or engine load. An AFR may be achieved by coordinating the amount of natural gas, gasoline, and air injected into a cylinder. In some embodiments the coordinated AFR may maximize fuel efficiency by minimizing the amount of gasoline delivered to the engine for a given AFR. Other embodiments may use alternate natural gas to gasoline ratios to achieve heightened soot production or decreased engine knock, for example.

A desired AFR may be determined in response to valve and/or valve seat temperature. Valve temperature may be a function of engine load and speed or may be measure by one or more sensors within the engine or exhaust system.

FIG. 10 shows a schematic diagram of a multi-cylinder engine in accordance with the present disclosure. In this embodiment the secondary injectant may include a highly ignitable fuel source such as carbon monoxide and/or hydrogen. Internal combustion engine 10 includes cylinders 14 coupled to intake passage 144 and dual exhaust passages 148 and 149. Intake passage 144 may include throttle 162. Exhaust passage 148 may include emissions control devices 178.

Cylinders 14 may be configured as part of cylinder head 201. In FIG. 10 cylinder head 201 is shown with two rows with four cylinders respectively. The rows of cylinders are arranged along two cylinder head banks in a V-shape configuration. In some examples, cylinder head 201 may have more or fewer cylinders, for example six cylinders. In some examples, the cylinders may be arranged in an inline or another suitable configuration.

Cylinder head 201 is coupled to a fuel system. Cylinder 14 is shown coupled to fuel injectors 166. In this example embodiment, fuel injector 166 is depicted as a direct fuel injector. Each fuel injector may be configured to deliver a specific quantity of fuel at a specific time point in the engine cycle in response to commands from controller 12. The fuel injector may be utilized to deliver combustible fuel to cylinder 14 during each combustion cycle. The timing and quantity of fuel injection may be controlled as a function of engine operating conditions as previously discussed.

Fuel injector 166 may be coupled to a fuel rail that may be coupled to a fuel line. The fuel line may be coupled to fuel tank. In some embodiments, the fuel tank may contain a gaseous fuel, such as CNG, methane, LPG, hydrogen gas, etc.

Intake passage 144 may have air filter 161 located therein. A throttle 162 may control in flow of air into the engine. The intake passage may branch into two distinct passages and may be coupled to the throttle 162 and/or may each have respective throttles located therein.

Each intake passage may be coupled to a compressor that may compress intake air. Each compressor may receive power from a turbine 147 located within the exhaust passages 148. Some embodiments may have one intake passage and one or more compressors that receive power from one or more turbines.

An additional throttle may be located downstream of the compressor 123 to control the flow of condensed air into the engine. One or more branches of the intake passage 144 may be coupled to a charge air cooler (CAC). In other embodiments, each branch may have a respective charge air cooler. Branches of the intake passage may converge upstream of the CAC or they may both be disposed at separate inlets of the CAC. Alternately, each branch may have a respective distinct CAC.

The charge air cooler may be coupled via one or more passages to the intake manifold of the engine for delivery to cylinders 14. A valve 129 may be coupled between the cylinders to control airflow into the engine. Cylinders 14 may be operated by using any of the aforementioned methods.

Exhaust gas may exit the cylinders 14 via an exhaust valve coupled to the cylinder and the exhaust manifold. In the dual bank cylinder configuration shown, a first line of cylinders may be coupled to a first side of exhaust manifold and a second line of cylinders may be coupled to a second side of exhaust manifold 149. The first and second side of exhaust manifold 149 may be separate or may branch downstream of exhaust manifold 149.

The first side of exhaust manifold 149 may be coupled to a reformer passage 131. A sensor 122 may be located within the exhaust passage and may communicate temperature, pressure, carbon monoxide, humidity, oxygen, etc with a controller. Sensor 122 may also be used with the controller to determine a mass of air through the engine. A turbine 147 may be coupled to reformer passage 131. Turbine 147 may provide power to compressor 123 for engine turbocharge. Valve 135 may control the flow of exhaust into the turbine.

Downstream of turbine 147, the exhaust passage may branch into two or more paths. A first path may be coupled to an emission control device 178 such as a catalyst which may be directly or indirectly coupled to a muffler or tailpipe. A second branch may be coupled to a reform catalyst 179. Reform catalyst 179 may have an inlet for CNG injection via injection pipe 181. Injection pipe 181 may be coupled to a tank that contains an amount of CNG that may or may not be the same tank that provides CNG to the engine for combustion. The tank may also be coupled to a tank with a different hydrocarbon fuel located therein. It may further be coupled to the fuel rail providing CNG to engine 10. In other words, injection pipe 181 may couple reform catalyst 179 to the first gaseous fuel source that provides fuel for engine 10. Injection pipe 179 may alternately couple reform catalyst 179 to a third gaseous fuel source that may or may not be provided for a purpose apart from providing gaseous fuel to the reform catalyst 179.

Reform catalyst 179 may be coupled to an EGR cooler 185 via a valve 183 that may be actuated by the control system to allow an amount of reformed exhaust gas into the intake system via EGR cooler 185. One or more sensors 122 located within the reformer passage may communicate with a control system. Reformer passage 131 may dispose on intake passage 144. This is a low pressure embodiment wherein the reformer passage is coupled to the exhaust passage downstream of turbine 147 and is disposed into the intake passage 144 upstream of the compressor.

In alternate high pressure embodiments, the reformer passage may couple to the exhaust passage upstream of the turbine and/or downstream of the compressor. In further embodiments the reformer passage may be embodied as a port injector or a direct injector. In these embodiments the reformer passage may be coupled directly to the engine 10 or cylinders 14 via an injection valve.

Note that this system may be used in combination with any of the aforementioned methods and systems disclosed. The reformed exhaust gas exiting reform catalyst 179 should be understood to be the secondary injectant and/or secondary fuel source. Thus, in an example, reformer passage 131 may be understood to be embodiment of a fuel tank containing a gaseous fuel. Thus the injection of reformed exhaust may be controlled by a routine method 300 or 900.

A low pressure EGR system 133 may be coupled to the second side of exhaust manifold 149 via a second exhaust passage 148. The exhaust passage 148 may include a valve 135 to meter an amount of exhaust gas entering turbine 147. Turbine 147 may be coupled and powered by compressor 123. An EGR path may branch from the exhaust passage upstream of an emission control device 178 that may be coupled to a muffler or tailpipe. EGR system 133 may also be coupled to an EGR cooler and one or more valves to control the flow of EGR into the intake system. An EGR system may be coupled to the intake system upstream of compressor 123. In a high pressure EGR system, EGR system 133 may be coupled to the exhaust passage upstream or downstream of turbine 147 and upstream or downstream of compressor 123. The exhaust passage and/or EGR system may include one or more sensors in communication with a control system that may measure humidity, temperature, pressure, carbon monoxide, oxygen, etc.

Other embodiments may not include an EGR system. Still further embodiments may couple reform passage 131 directly to an EGR path such that the exhaust gas that is diverted into the reform passage is taken from an amount of exhaust that would otherwise be recirculated via EGR. In a still further system, the reform passage may have an inlet coupled to an exhaust passage and an outlet coupled to an EGR system. The outlet may be located upstream of an EGR cooler.

The timing and flow rates of the direct injection of a secondary injectant may be coordinated to coincide with events occurring during the combustion sequence. Note that the secondary injectant may be a diluent or secondary fuel. Further, the timing and flow rates of the direct injection of a secondary injectant may be determined as a function of engine operating conditions or as a function of the composition of the secondary injectant. Further, spark timing and boost pressure may be adjusted in accordance with the timing and flow rates of the direct injection of a secondary injectant.

Reform catalyst 179 may be embodied as a steam reform catalyst. Some advantageous embodiments may use a calcium carbide catalyst. At high temperatures a steam reform catalyst may catalyze the reformation of methane ($CH_4$) and steam ($H_2O$) into carbon monoxide and gaseous hydrogen. Both of which have a higher AFR range and soot production rate than methane. When methane is enriched with CO and $H_2$, the AFR richness operating limit may increase. This allows for richer and to cooler combustion. This highly combustible mixture may be referred to as syngas and may be created within a steam reformation catalyst at temperatures between 700-1100 C (1300-2000 F).

Steam may be provided via the hot exhaust gas which tends to be rich in water vapor. Additional steam may be injected using water or wiper fluid for increased steam production. Methane may be provided via the CNG for engine operation in CNG engines.

Steam reform catalyst 179 may include a monolithic substrate or a high surface area support plate located therein. The substrate or support plate may be coated in a reactive coating that may contain a metallic oxide. Therefore, CNG and EGR gas passing through reform catalyst 179 may come into contact with the metallic oxide coating. The metallic oxide may include a transition metal oxide such as nickel oxide, copper oxide, zinc oxide, manganese oxide, molybdenum, chromium oxide, vanadium oxide, titanium oxide, iron oxide, cobalt oxide, tungsten oxide, zirconium oxide, aluminum oxide, cerium oxide, praseodymium oxide, or neodymium oxide. In some embodiments, the substrate or plate may further include a precious metal such as platinum, palladium, rhodium, ruthenium, gold or silver highly dispersed on a substrate or supporting plate. In some advantageous embodiments, the reform catalyst may be a calcium carbide catalyst.

Exhaust gas may be maintained at a given richness or percent $H_2/CO$ that may be conducive to heightened steam reformation. Exhaust recirculated into the reformation passage may be maintained near 10% rich or at stoichiometry. Exhaust gas recirculated into the reformation path may also be maintained at a 12% $H_2/CO$ concentration. The engine may operate at a level of air charge richness during reformation conditions to provide exhaust gas with a desired richness. Further, a valve allowing exhaust gas to enter the reformation system may be opened when the exhaust gas is within a richness or $H_2/CO$ range. This may be determined by one or more oxygen, carbon monoxide, humidity or temperature sensors.

Further, exhaust gas may pass through the reformation system when the engine is operating within a temperature range. This may be determined by temperature sensors within the engine or exhaust manifold. Valves coupling the reformation passage to the exhaust passage may open when the engine is at as predetermined temperature threshold minimum. This minimum may be 700 C within the exhaust system and 400 C within the reformation passage. Further, temperature sensors may be located within the reformation passage. The reformation passage may be decoupled from the exhaust system when the temperature reaches a temperature threshold maximum. This may be a maximum within the reformation passage, within the engine, or within the exhaust manifold. This maximum may be 1100 C within the exhaust system and 700 C within the reformation passage.

FIG. 11 shows a flowchart depicting method 1000 in accordance with the present disclosure. Method 1000 may be carried out by controller 12. Method 1000 may be implemented as a subroutine of another method, for example method 300. In particular, method 1000 may be implemented in a gaseous fueled, bi-fueled or multi-fueled vehicle comprising a reservoir of a secondary injectant, for example, the system depicted in FIG. 2. Method 1000 may be executed as part of a routine to mitigate valve recession or engine knock.

Method 1000 may also be implemented in an engine system such as that depicted in FIG. 10. Further, method 1000 may be used on any system wherein AFR operation limits are increased by adding a secondary fuel source that is created as a function of an amount of a first gaseous fuel source such as CNG. A non-limiting example of a compatible system may include a reformer device that reforms CNG into a secondary injectant via a reaction that includes one or more additional reactants or catalysts. For example, method 1000 may control an amount of CNG injected into a steam reformation catalyst within an EGR system with an amount of EGR therein. The steam reformation catalyst may further include an amount of metallic oxide. The description below may refer to a system including a reformation catalyst using CNG injection as the first gaseous fuel source. The CNG may react with an amount of EGR gas to form a secondary injectant. More specifically, the CNG may include methane, the EGR may contain and amount of $H_2O$ and the secondary injectant may be a combination of $H_2$ and CO called syngas. The reaction may be depicted by the following equation: $CH_4+H_2O->CO+3H_2$ Method 1000 may begin by determining engine operating conditions. At 880 engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc. Operating conditions may also include the current AFR and the current amount of secondary fuel/injectant being injected into the engine. It may further include a current amount of CNG being injected into the secondary fuel source (i.e. reformation catalyst) (CNG_Mass), an amount of additional AFR provided by the secondary fuel (AFR_From_H2CO), and the current percent of secondary-fuel-to-EGR injected into the intake system.

At 882, method 1000 may include measuring or estimating the temperature of an engine valve. Valve temperature (Valve_Temp) may be measured directly using a temperature sensor located on or near the valve. It may also be inferred from other operating conditions such as engine load, speed, or temperature sensor output in another part of the engine system such as the exhaust system.

At 884 a desired AFR may be determined based on the current valve temperature. The AFR may be determined so as to keep the engine or a valve temperature within a desired operating range. This range may correspond to an engine temperature that contributes to valve recession or engine knock, for example.

In other embodiments (not shown), the method may terminate after 882 if the valve or engine temperature is not above a threshold. Secondary fuel may thus be added when the system at or near an overheat threshold.

At 886 the amount of additional AFR desired by the addition of the secondary injectant is determined. The secondary injectant may also refer to a fuel and may include $H_2$ and CO, for example. Note that for the purposes of this disclosure the secondary fuel and secondary injectant may refer to the same substance and/or may be used interchangeably. The amount of additional AFR desired by the addition of the secondary injectant may be the current AFR minus the AFR desired. Note that the current AFR may be achieved using an amount of secondary injectant thus the current AFR may not necessarily refer to the amount of AFR achieved from CNG combustion alone.

The additional AFR desired from $H_2$ and CO may then be compared to a threshold. If the AFR from $H_2$ and CO is found to be above a threshold than the percent of $H_2$ and CO per mass of EGR recirculated into the intake may be increased. In other words, if the current AFR is higher than the desired AFR than the engine is running leaner than desired thus the percent $H_2$ and CO may be increased for richer operation. Alternately, if the current AFR is smaller than the desired AFR then the engine is running richer than desired and the percent $H_2$ and CO delivered to the engine may decrease. In some embodiments the threshold may therefore be zero.

In some embodiments, if the AFR from $H_2$ and CO is below a threshold the percent $H_2$ and CO may decrease to zero such that no CNG is injected into the reformer. This may be advantageous so as to operate with maximum efficiency when valve cooling or engine knock abatement is not necessary.

In still further embodiments, an additional AFR desired via the secondary injectant may be calculated as a function of the current AFR and the desired AFR and may not be subject to a threshold or a presiding additional AFR desired. The percent of secondary injectant per mass of EGR may similarly be calculated as a function of the additional AFR desired; therefore it may not be increased or decreased from a presiding value but, instead, independently calculated upon each iteration of method 1000.

The mass of CNG delivered to the reformation device may be determined at 894 to achieve the percent $H_2$ and CO determined at 890 or 892. The mass of CNG to be injected into the reformer may be a function of the percent $H_2$ and CO determined, the mass of EGR being delivered to the intake system, engine speed, and engine load. The mass of $H_2$ and CO produced by the reformation device is dependent on the mass of CNG injected into the reformation device. At 896 the mass of CNG determined at 894 may be injected into the reformation device. The process may repeat for the duration of engine operation. The CNG delivered to the reformer may be a first gaseous fuel source that also provides CNG to the engine for combustion. In alternate embodiments it may be a third gaseous fuel source that may be provided for the purpose of providing a third gaseous fuel source to the reform catalyst.

FIG. 12 shows a schematic diagram of a combustion cylinder 14 in accordance with the present disclosure. As described above, and with regard to FIGS. 1 and 2, cylinder 14 comprises chamber walls 136, cooling sleeve 118, intake valve 150, which is disposed between cylinder 14 and intake passages 144, exhaust valve 156, which is disposed between cylinder 14 and exhaust manifold 149, piston 138, which may be coupled to crankshaft 140, and spark plug 192. In this example, cylinder 14 is shown coupled to direct fuel injector 166 and direct secondary injector 966. Cylinder 14 may also be coupled to port fuel injector 170 (not shown).

The combustion chamber of cylinder 14 may be striated into two zones, end zone 901 and interior zone 902. End zone 901 may include the regions of the combustion chamber most likely to become the end zone of combustion, and thus the regions of the combustion chamber most likely to undergo engine knock. Direct secondary injector 966 may be configured so as to inject a diluent into the regions of the combustion chamber most likely to become the end zone of combustion. In this way, the secondary injectant can be efficiently targeted to parts of the cylinder where knock is most likely to occur.

Direct secondary injector 966 may be configured to inject fluid as a function of piston position combustion cycle, for example, injecting at the end of combustion. Injector 966 may inject large droplets, as compared to the finely atomized droplets injected by direct injector 166. In this way, the injection streams exiting injector 966 may penetrate further into the end zone 901 of cylinder 14, where end zone 901 is positioned lower in the combustion chamber than zone 902. In some embodiments, injector 966 may be a radially targeted injector. Direct injector 166 may be configured to inject fuel into interior zone 902. Direct injecting a quantity of the liquid fuel may comprise injecting the liquid fuel at different timings responsive to a predicted location of an end zone of combustion. Additionally, injecting the liquid may comprise injecting liquid fuel with a radially targeted injector to different locations of the cylinder responsive to a predicted location of an end zone of combustion. In this way, a stratified fuel type charge may be established.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   determining a desired air-to-fuel ratio (AFR) based on an engine cylinder valve temperature;
   decreasing a ratio of a quantity of a gaseous fuel port-injected to an engine cylinder during a cylinder cycle to a quantity of a secondary injectant direct-injected to the cylinder during the cylinder cycle when the desired AFR is below a richness threshold; and
   increasing the ratio when the desired AFR is above the richness threshold,
   where direct-injecting the secondary injectant further comprises injecting liquid fuel to different locations of the cylinder at a timing responsive to a predicted location of an end zone of combustion.

2. The method of claim 1, wherein the engine is turbocharged, and wherein the engine cylinder valve is an exhaust valve.

3. The method of claim 1, wherein the gaseous fuel is one or more of CNG and methane, and wherein the cylinder valve is an exhaust valve.

4. The method of claim 1, wherein the liquid fuel is one or more of a methanol solution, an ethanol solution, windshield wiper fluid, or a gasoline solution.

5. The method of claim 1, wherein the quantity of the secondary injectant is a function of an amount of alcohol in the secondary injectant.

6. The method of claim 1, where the timing at which the secondary injectant is injected is during a compression stroke, prior to spark ignition.

7. The method of claim 1, where the timing at which the secondary injectant is injected is during a power stroke, following spark ignition.

8. The method of claim 1, further comprising:
   operating the engine with a substantially stoichiometric AFR after port-injecting the gaseous fuel and before direct-injecting the secondary injectant, and operating the engine with a substantially rich AFR after direct-injecting the secondary injectant.

9. The method of claim 1, further comprising:
   determining the quantity of the gaseous fuel and the quantity of the secondary injectant based on the ratio and further based on an intake air mass and the desired AFR,
   where the quantity of the gaseous fuel is combusted during operation of an engine with a substantially lean AFR, and the direct injection of the quantity of the secondary injectant decreases the AFR to a substantially stoichiometric AFR or a substantially rich AFR.

10. The method of claim 1, where the engine cylinder valve temperature includes a temperature of an exhaust valve.

11. The method of claim 1, where the quantity of the secondary injectant and the quantity of the gaseous fuel are determined as a function of an intake air mass as well as the ratio and the desired AFR.

12. The method of claim 1, wherein the secondary injectant has a substantially higher hydrocarbon content than the gaseous fuel.

13. An engine system, comprising:
engine cylinders coupled to a first gaseous fuel tank with a first gaseous fuel located therein and a secondary fuel tank with a secondary injectant located therein; and
a control system with non-transitory instructions stored in memory to determine a desired AFR in response to an engine valve temperature, predict a location of an end zone of combustion in each cylinder, and directly inject an amount of secondary injectant into the cylinders, the amount based on the desired AFR, at a timing responsive to the predicted location.

14. The engine system of claim 13, wherein the first gaseous fuel is one or more of CNG and methane.

15. The engine system of claim 13, wherein the secondary injectant is one or more of a windshield wiper fluid, syngas, gasoline, or another fuel source with a substantially higher hydrocarbon content than the first gaseous fuel.

16. A method for operating a turbocharged engine, comprising:
port-injecting an amount of a gaseous fuel into an engine;
direct-injecting a first amount of a secondary injectant into the engine if a desired AFR is above a threshold; and
direct-injecting a second, different, amount of the secondary injectant into the engine if the desired AFR is below the threshold, the first and second amounts of the secondary injectant determined in response to an engine intake air mass flow,
where direct-injecting the first and second amounts of the secondary injectant comprises direct-injecting the secondary injectant to different locations of the cylinder at timings responsive to a predicted location of an end zone of combustion.

17. The method of claim 16, further comprising determining the desired AFR in response to an engine valve temperature.

* * * * *